US012613422B2

(12) United States Patent
Kim et al.

(10) Patent No.: US 12,613,422 B2
(45) Date of Patent: *Apr. 28, 2026

(54) METHOD FOR PROVIDING AUGMENTED REALITY CONTENT IN VEHICLE, AND WEARABLE DEVICE AND ELECTRONIC DEVICE PERFORMING THE SAME

(71) Applicant: SAMSUNG ELECTRONICS CO., LTD., Suwon-si (KR)

(72) Inventors: Dohyoung Kim, Suwon-si (KR); Jimin Kim, Suwon-si (KR); Joayoung Lee, Suwon-si (KR); Changsoo Lee, Suwon-si (KR); Changyoul Lee, Suwon-si (KR); Hoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/945,816

(22) Filed: Nov. 13, 2024

(65) Prior Publication Data

US 2025/0067992 A1 Feb. 27, 2025

Related U.S. Application Data

(63) Continuation of application No. PCT/KR2022/015229, filed on Oct. 8, 2022.

(30) Foreign Application Priority Data

Dec. 2, 2021 (KR) ........................ 10-2021-0171152
Jan. 7, 2022 (KR) ........................ 10-2022-0002846

(51) Int. Cl.
*G02B 27/01* (2006.01)
*G06F 1/16* (2006.01)
(Continued)

(52) U.S. Cl.
CPC ....... *G02B 27/0179* (2013.01); *G02B 27/017* (2013.01); *G02B 27/01* (2013.01);
(Continued)

(58) Field of Classification Search
CPC .. G02B 27/0179; G02B 27/01; G02B 27/017; G02B 2027/014; G02B 2027/0178;
(Continued)

(56) References Cited

U.S. PATENT DOCUMENTS 9,274,337 B2 3/2016 Meadows
9,459,692 B1 10/2016 Li
(Continued)

FOREIGN PATENT DOCUMENTS

CN 104102007 10/2014
KR 10-2016-0003553 A 1/2016
(Continued)

OTHER PUBLICATIONS

U.S. Appl. No. 18/081,120, filed Dec. 14, 2022, Kim et al.
PCT International Search Report dated Jan. 10, 2023 for PCT/ KR2022/015229.

*Primary Examiner* — Adam J Snyder
(74) *Attorney, Agent, or Firm* — NIXON & VANDERHYE P.C.

(57) ABSTRACT

A method of providing an augmented reality (AR) content in a vehicle, and/or a wearable AR device and an electronic device for performing a method. The wearable AR device may include a processor and a memory storing instructions. The processor, when executing the instructions, causes the wearable AR device to: set reference points corresponding to positions of anchor devices on first spatial map data corresponding to a space of a vehicle, determine a position and a direction of the wearable AR device on the first spatial map data based on the reference points and a positional relation-
(Continued)

ship between the wearable AR device and anchor devices, and control output AR content based on the determined position and the determined direction of the wearable AR device.

20 Claims, 19 Drawing Sheets

(51) Int. Cl.

| | |
|---|---|
| *G06F 3/01* | (2006.01) |
| *G06F 3/04815* | (2022.01) |
| *G06F 3/0487* | (2013.01) |
| *G06Q 50/10* | (2012.01) |
| *G06T 19/00* | (2011.01) |
| *H04N 13/332* | (2018.01) |
| *H04N 13/366* | (2018.01) |
| *H04N 13/383* | (2018.01) |
| *H04N 21/414* | (2011.01) |
| *H04N 21/442* | (2011.01) |
| *H04N 21/81* | (2011.01) |

(52) U.S. Cl.
CPC .................. *G02B 2027/014* (2013.01); *G02B 2027/0178* (2013.01); *G02B 2027/0181* (2013.01); *G02B 2027/0183* (2013.01); *G06F 1/163* (2013.01); *G06F 1/1637* (2013.01); *G06F 1/1686* (2013.01); *G06F 1/1694* (2013.01); *G06F 3/011* (2013.01); *G06F 3/017* (2013.01); *G06F 3/04815* (2013.01); *G06F 3/0487* (2013.01); *G06Q 50/10* (2013.01); *G06T 19/00* (2013.01); *H04N 13/332* (2018.05); *H04N 13/366* (2018.05); *H04N 13/383* (2018.05); *H04N 21/414* (2013.01); *H04N 21/442* (2013.01); *H04N 21/81* (2013.01)

(58) Field of Classification Search
CPC .... G02B 2027/0181; G02B 2027/0183; G06F 1/163; G06F 1/1637; G06F 1/1686; G06F 1/1694; G06F 3/017; G06F 3/04815; G06F 3/0487; G06F 3/011; G06Q 50/10; G06T 19/00; H04N 13/332; H04N 13/366; H04N 13/383; H04N 21/414; H04N 21/442; H04N 21/81
See application file for complete search history.

(56) References Cited

U.S. PATENT DOCUMENTS

| | | | |
|---|---|---|---|
| 9,539,352 B2 | 1/2017 | Keener et al. | |
| 9,928,653 B2 | 3/2018 | Atsmon | |
| 10,270,642 B2 | 4/2019 | Zhang et al. | |
| 10,279,925 B2 | 5/2019 | Cole et al. | |
| 10,469,968 B2 | 11/2019 | Peters et al. | |
| 10,503,245 B2 | 12/2019 | Rothkopf | |
| 12,174,394 B2 * | 12/2024 | Kim ..................... | G06F 1/1637 |
| 2015/0294505 A1 | 10/2015 | Atsmon | |
| 2016/0048249 A1 | 2/2016 | Chen | |
| 2017/0115730 A1 | 4/2017 | Knebel | |
| 2018/0081426 A1 | 3/2018 | Rothkopf | |

FOREIGN PATENT DOCUMENTS

| | | | |
|---|---|---|---|
| KR | 10-1902715 | B1 | 9/2018 |
| KR | 10-2019-0105532 | A | 9/2019 |
| WO | WO 2017/155231 | A1 | 9/2017 |
| WO | WO 2020/060119 | A1 | 3/2020 |

* cited by examiner

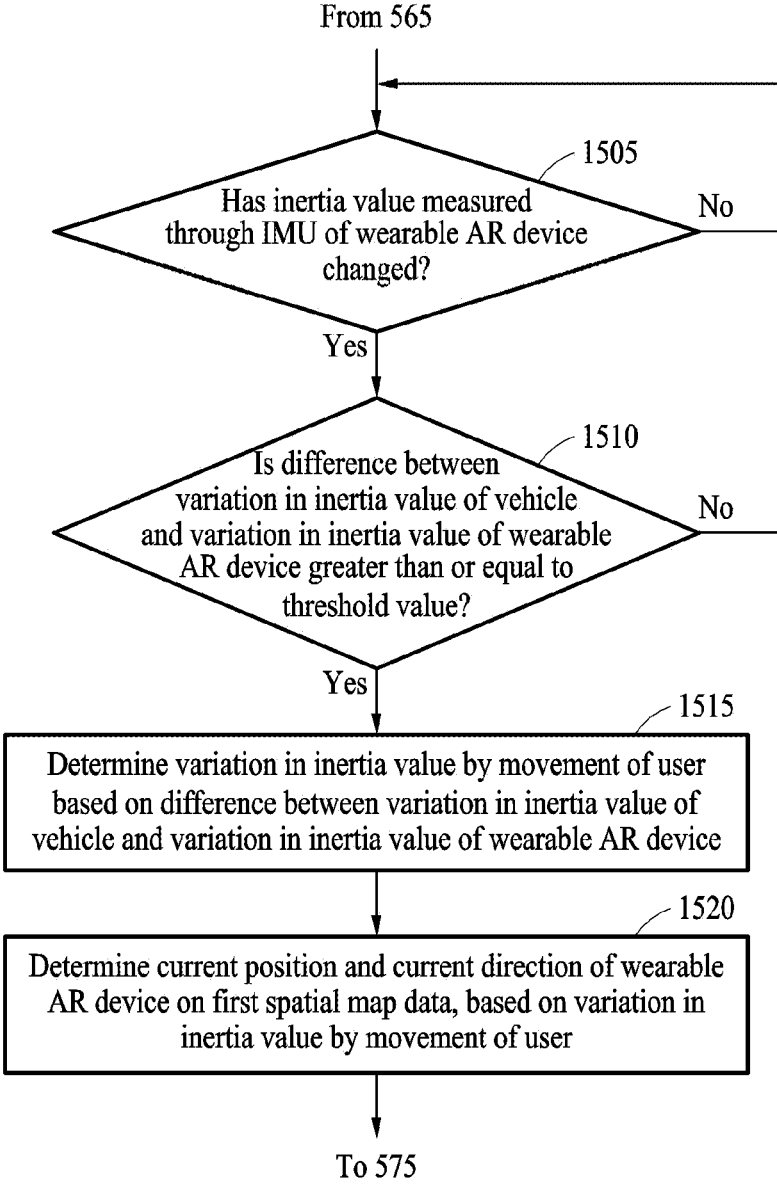

From 565

Has inertia value measured
through IMU of wearable AR device
changed?                                    1505

No

Yes

Is difference between
variation in inertia value of vehicle
and variation in inertia value of wearable
AR device greater than or equal to
threshold value?                          1510

No

Yes

Determine variation in inertia value by movement of user
based on difference between variation in inertia value of
vehicle and variation in inertia value of wearable AR device     1515

Determine current position and current direction of wearable
AR device on first spatial map data, based on variation in
inertia value by movement of user                                1520

METHOD FOR PROVIDING AUGMENTED REALITY CONTENT IN VEHICLE, AND WEARABLE DEVICE AND ELECTRONIC DEVICE PERFORMING THE SAME

CROSS-REFERENCE TO RELATED APPLICATIONS

This application is a continuation of U.S. application Ser. No. 18/081,120 filed Dec. 14, 2022, which is a continuation of International Application No. PCT/KR2022/015229 designating the United States, filed on Oct. 8, 2022, in the Korean Intellectual Property Receiving Office and claiming priority to Korean Patent Application No. 10-2021-0171152 filed on Dec. 2, 2021, and Korean Patent Application No. 10-2022-0002846 filed on Jan. 7, 2022, in the Korean Intellectual Property Office, the disclosures of which are all incorporated by reference herein in their entireties.

BACKGROUND

1. Field

Various example embodiments relate to technology for providing augmented reality (AR) contents in a vehicle.

2. Description of Related Art

A wearable augmented reality (AR) device, such as AR (eye) glasses, may be a next-generation device that displays a virtual image (e.g., information of objects) over a real image currently being viewed by a user. The wearable AR device may include a camera and a sensor that recognize an environment thereabout, and an optical display that analyzes information acquired through the camera and the sensor and displays a virtual AR content over a real screen currently being viewed by a user.

A user may wear a wearable device on their face. The wearable device may perform vision processing, such as, for example, simultaneous localization and mapping (SLAM), head tracking, hand tracking, and surface reconstruction, based on data acquired using a camera and a sensor and may show the user an AR content overlapping a real environment.

SUMMARY

In the case of a wearable augmented reality (AR) device to be used in a moving space, such as, for example, a vehicle or a train, a position of a user may change as the vehicle itself moves, and an inertial measurement unit (IMU) of the wearable AR device may be affected thereby. The IMU of the wearable AR device may not be able to differentiate between a movement of the vehicle and a movement of the user inside the vehicle, and the wearable AR device may therefore output an AR content that moves differently from what the user is intended.

An aspect of various example embodiments provides an AR content providing method and a wearable AR device that may determine the position and direction of the wearable AR device in a vehicle and provide an AR content corresponding to a user's view independently of a movement of the vehicle.

However, technical aspects are not limited to the foregoing aspect, and other technical aspects may also be present. Additional aspects will be set forth in part in the description which follows and, in part, will be apparent from the description, or may be learned by practice of the presented embodiments of the disclosure.

According to an example embodiment, there may be provided a wearable AR device for providing an AR content, wherein the wearable AR device may include at least one processor; and a memory configured to store therein instructions to be executed by the processor. When the instructions are executed by the at least one processor, the at least one processor may determine whether the wearable AR device is in a space of a vehicle based on at least one of information received from the vehicle or a value measured using at least one sensor of the wearable AR device; when it is determined that the wearable AR device is not in the space of the vehicle, output an AR content corresponding to a space around the wearable AR device based on the value measured using the at least one sensor of the wearable AR device; and when it is determined that the wearable AR device is in the space of the vehicle, determine whether there are anchor devices of the vehicle capable of communicating with the wearable AR device, and when it is determined that there are the anchor devices, output an AR content corresponding to a space of the vehicle around the wearable AR device by communicating with the anchor devices.

According to an example embodiment, there may be provided an AR content providing method using a wearable AR device, wherein the AR content providing method may include: determining whether the wearable AR device is in a space of a vehicle based on at least one of information received from the vehicle or a value measured using at least one sensor of the wearable AR device; when it is determined that the wearable AR device is not in the space of the vehicle, outputting an AR content corresponding to a space around the wearable AR device based on the value measured using the at least one sensor of the wearable AR device; when it is determined that the wearable AR device is in the space of the vehicle, determining whether there are anchor devices of the vehicle capable of communicating with the wearable AR device; and when there are the anchor devices capable of communication, outputting an AR content corresponding to a space of the vehicle around the wearable AR device by communicating with the anchor devices.

According to various example embodiments, an AR content providing method and/or a wearable AR device may determine the position and direction of the wearable AR device in a vehicle and provide an AR content corresponding to a user's view independently of a movement of the vehicle.

Other features and aspects will be apparent from the following detailed description, the drawings, and the claims.

BRIEF DESCRIPTION OF THE DRAWINGS

The above and other aspects, features, and advantages of certain example embodiments will be more apparent from the following detailed description, taken in conjunction with the accompanying drawings, in which:

FIG. 15 is a flowchart illustrating an example operation of determining a current position and a current direction of a wearable AR device by the wearable AR device using an inertia value of a vehicle according to an example embodiment;

DETAILED DESCRIPTION

Figure 1:
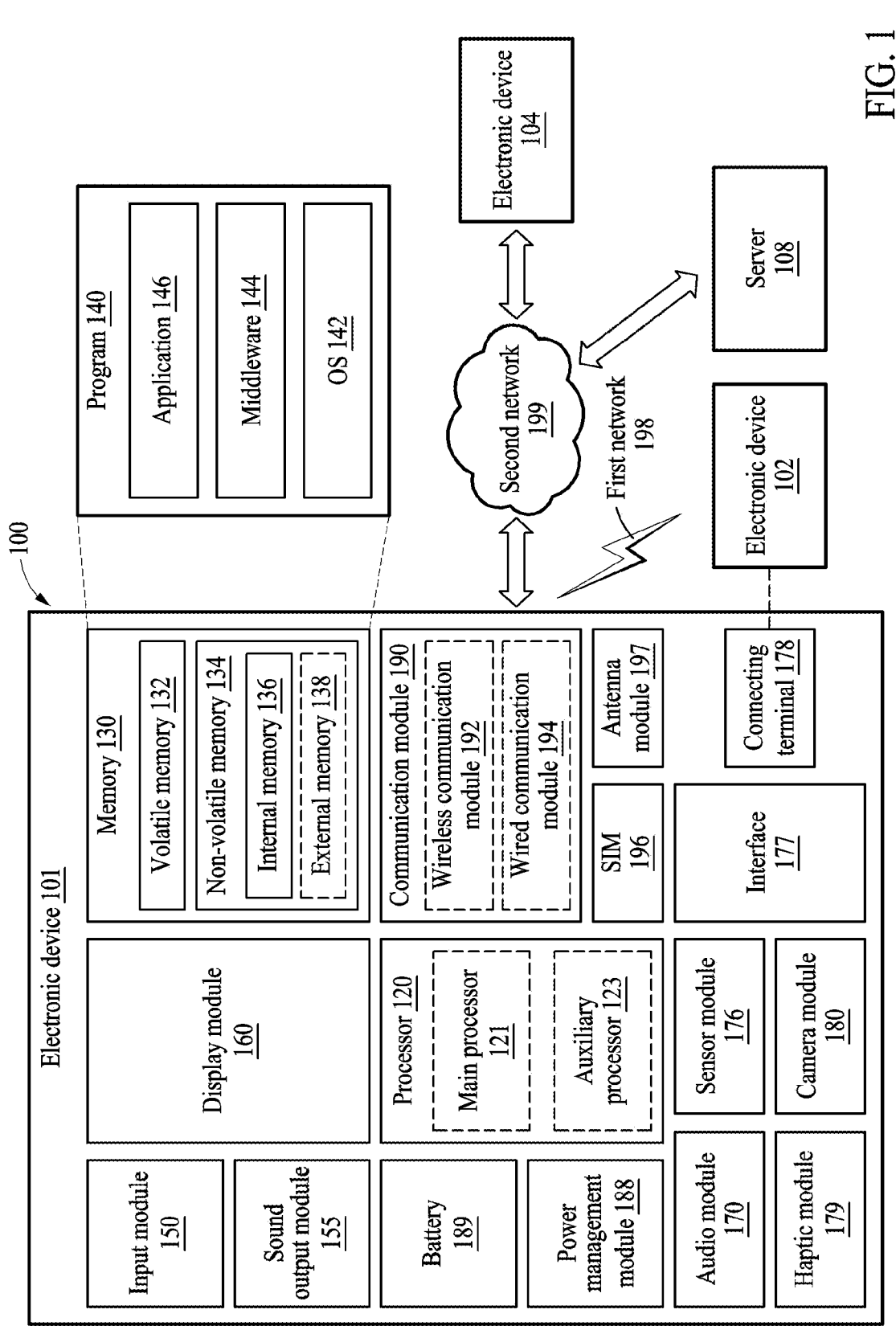
FIG. 1 is a block diagram illustrating an example electronic device in a network environment according to an example embodiment.

Hereinafter, various embodiments will be described in greater detail with reference to the accompanying drawings. When describing the embodiments with reference to the accompanying drawings, like reference numerals refer to like elements and a repeated description related thereto will be omitted.

FIG. 1 is a block diagram illustrating an example electronic device in a network environment according to an embodiment. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an embodiment, as at least a part of data processing or computations, the processor 120 may store a command or data received from another component (e.g., the sensor module 176 comprising at least one sensor or the communication module 190 comprising communication circuitry) in a volatile memory 132, process the command or data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specifically for artificial intelligence (AI) model processing. An AI model may be generated by machine learning. The machine learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry for controlling a corresponding one of the display, the hologram device, and the projector. According to an embodiment, the display module 160 may include a touch sensor adapted to sense a touch, or a pressure sensor adapted to measure an intensity of a force of the touch.

The audio module 170 may convert sound into an electric signal or vice versa. According to an embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, and flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC on a first surface (e.g., a bottom surface) of the PCB, or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an embodiment, commands or data may be transmitted or received between the electronic device 101 and the external electronic device (e.g., the electronic device 104) via the server 108 coupled with the second network 199. Each of the external electronic devices (e.g., the electronic devices 102 and/or 104) may be a device of the same type as or a different type from the electronic device 101. According to an embodiment, all or some of operations to be executed by the electronic device 101 may be executed by one or more of the external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 101. The electronic device 101 may provide the result, with or without further processing of the result, as at least a part of a response to the request. To that end, cloud computing, distributed computing, mobile edge computing (MEC), or client-server computing technology may be used, for example. The electronic device 101 may provide ultra-low latency services using, e.g., distributed computing or MEC. In an embodiment, the external electronic device (e.g., the electronic device 104) may include an Internet-of-things (IoT) device. The server 108 may be an intelligent server using machine learning and/or a neural network. According to an embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
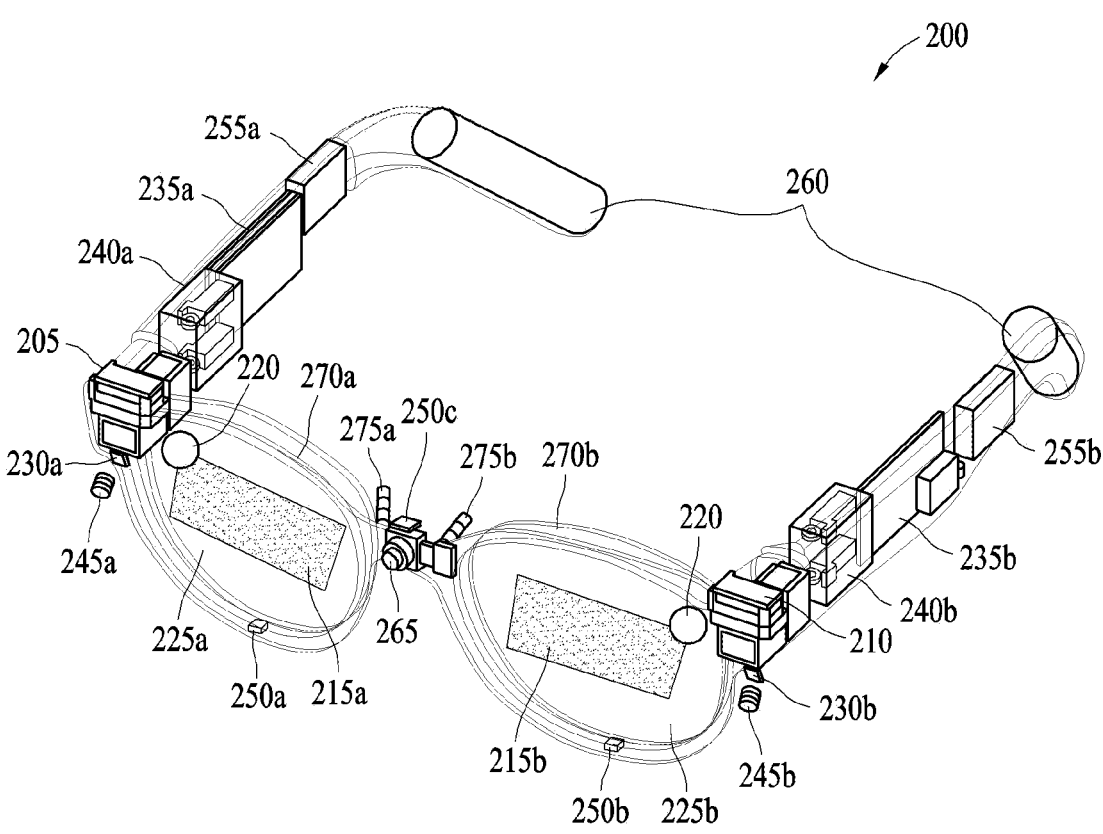
FIG. 2 is a perspective view of an example wearable augmented reality (AR) device according to an example embodiment.

FIG. 2 is a perspective view of an example wearable augmented reality (AR) device according to an embodiment.

Referring to FIG. 2, a wearable AR device 200 may be worn on a face of a user to provide the user with an image associated with an AR and/or virtual reality (VR) service.

In an embodiment, the wearable AR device 200 may include a first display 205, a second display 210, screen display portions 215*a* and 215*b*, an optical input member 220, a first transparent member 225*a*, a second transparent member 225*b*, lighting units 230*a* and 230*b* comprising light sources, a first printed circuit board (PCB) 235*a*, a second PCB 235*b*, a first hinge 240*a*, a second hinge 240*b*, first cameras 245*a* and 245*b*, a plurality of microphones (e.g., a first microphone 250*a*, a second microphone 250*b*, and a third microphone 250*c*), a plurality of speakers (e.g., a first speaker 255*a* and a second speaker 255*b*), a battery 260, second cameras 275*a* and 275*b*, a third camera 265, and visors 270*a* and 270*b*.

In an embodiment, a display (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (micro-LED), or the like. Although not illustrated in the drawings, when the display is one of an LCD, a DMD, and an LCOS, the wearable AR device 200 may include a light source configured to emit light to a screen output area of the display. In another embodiment, when the display is configured to generate light by itself, for example, when the display is either an OLED or a micro-LED, the wearable AR device 200 may provide a virtual image of a relatively high quality to the user even though a light source is not included. For example, when the display is implemented as an OLED or a micro-LED, such a light source may be unnecessary, and accordingly the wearable AR device 200 may be lightened. The display capable of generating light by itself may be referred to herein as a "self-luminous display," and the following description will be made on the assumption of the self-luminous display.

In an embodiment, the display (e.g., the first display 205 and the second display 210) may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU) comprising at least one light source, when it is implemented by the micro-LED as described above.

However, examples are not limited thereto, and a single pixel may include R, G, and B, and a single chip may be implemented by a plurality of pixels including R, G, and B pixels. In an embodiment, the display (e.g., the first display 205 and the second display 210) may include a display area including pixels for displaying a virtual image and light-receiving pixels (e.g., photosensor pixels) that are disposed between pixels and configured to receive light reflected from eyes of a user, convert the received light into electrical energy, and output the electrical energy.

In an embodiment, the wearable AR device 200 may detect a gaze direction (e.g., a movement of pupils) of the user using the light-receiving pixels. For example, the wearable AR device 200 may detect and track a gaze direction of a right eye of the user and a gaze direction of a left eye of the user through one or more light-receiving pixels of the first display 205 and one or more light-receiving pixels of the second display 210. The wearable AR device 200 may determine a central position of a virtual image based on the gaze directions (e.g., directions in which the pupils of the right eye and the left eye of the user gaze) that are detected through the light-receiving pixels.

In an embodiment, light emitted from the display (e.g., the first display 205 and the second display 210) may reach the screen display portion 215a formed on the first transparent member 225a that faces the right eye of the user and the screen display portion 215b formed on the second transparent member 225b that faces the left eye of the user, by passing through a lens (not shown) and a waveguide. For example, the light emitted from the display (e.g., the first display 205 and the second display 210) may be reflected from a grating area formed in the optical input member 220 and the screen display portions 215a and 215b by passing through the waveguide, and may then be transmitted to the eyes of the user. The first transparent member 225a and/or the second transparent member 225b may be formed of, for example, a glass plate, a plastic plate, or a polymer, and may be transparently or translucently formed.

In an embodiment, the lens (not shown) may be disposed in front of the display (e.g., the first display 205 and the second display 210). The lens may include a concave and/or convex lens. For example, the lens may include a projection lens or a collimation lens.

In an embodiment, the screen display portions 215a and 215b or a transparent member (e.g., the first transparent member 225a and the second transparent member 225b) may include a reflective lens, a lens including the waveguide.

The waveguide may be formed of glass, plastic, or a polymer, and may have a nanopattern formed on one surface of the inside or outside thereof, for example, a grating structure of a polygonal or curved shape. In an embodiment, light incident on one end of the waveguide may be propagated inside a display waveguide by the nanopattern to be provided to the user. For example, the waveguide formed as a freeform prism may provide the incident light to the user through a reflection mirror. The waveguide may include at least one of a reflective element (e.g., a reflection mirror) and at least one diffractive element (e.g., a diffractive optical element (DOE) or a holographic optical element (HOE)). The waveguide may guide light emitted from the display (e.g., the first display 205 and the second display 210) to the eyes of the user, using the at least one diffractive element or the reflective element included in the waveguide.

In an embodiment, the diffractive element may include the optical input member 220 and/or an optical output member (not shown). For example, the optical input member 220 may refer to an input grating area, and the optical output member may refer to an output grating area. The input grating area may function as an input end to diffract (or reflect) light output from the display (e.g., the first display 205 and the second display 210) (e.g., a micro-LED) to transmit the light to the transparent member (e.g., the first transparent member 225a and/or the second transparent member 225b) of the screen display portions 215a and 215b. The output grating area may function as an outlet to diffract (or reflect), to the eyes of the user, light transmitted to the transparent member (e.g., the first transparent member 225a and/or the second transparent member 225b) of the waveguide.

In an embodiment, the reflective element may include an optical total reflection element or a total reflection waveguide for total internal reflection (TIR). For example, total reflection or TIR, which is one of schemes for inducing light, may form an angle of incidence such that light (e.g., a virtual image) input through the input grating area is completely or almost completely reflected from a portion (e.g., a specific surface) of the waveguide, to completely or almost completely transmit the light to the output grating area.

In an embodiment, light emitted from the display (e.g., the first display 205 and the second display 210) may be guided by the waveguide through the optical input member 220. The light traveling in the waveguide may be guided toward the eyes of the user through the optical output member. The screen display portions 215a and 215b may be determined based on the light emitted toward the eyes of the user.

In an embodiment, the first cameras 245a and 245b may include cameras used for three degrees of freedom (3DoF) and six degrees of freedom (6DoF) head tracking, hand detection and tracking, and gesture and/or spatial recognition. For example, the first cameras 245a and 245b may each include a global shutter (GS) camera to detect and track movements of a head or hand.

For example, the first cameras 245a and 245b may use a stereo camera for head tracking and spatial recognition and may use cameras of the same specification and performance. For example, for detection and tracking of a quick hand movement and a fine finger movement, the first cameras 245a and 245b may use a GS camera exhibiting a favorable performance (e.g., image drag).

In an embodiment, the first cameras 245a and 245b may use a rolling shutter (RS) camera. The first cameras 245a and 245b may perform a 6DoF-based spatial recognition function and a depth imaging-based simultaneous localization and mapping (SLAM) function. In addition, the first cameras 245a and 245b may perform a user gesture recognition function.

In an embodiment, the second cameras 275a and 275b may be used to detect and track the pupils of the eyes of the user. The second cameras 275a and 275b may also be referred to as an eye-tracking (ET) camera. The second cameras 275a and 275b may track a gaze direction of the user. Based on the gaze direction of the user, the wearable AR device 200 may dispose a center of a virtual image projected onto the screen display portions 215a and 215b at a position depending on a direction in which the pupils of the user gaze.

The second cameras 275a and 275b for tracking the gaze direction may use a GS camera to detect the pupils and track a quick movement of the pupils. The second cameras 275a and 275b may be installed for the left eye and the right eye of the user, respectively, and may use cameras of the same performance and specifications.

In an embodiment, the third camera 265 may be referred to as a "high-resolution (HR) camera" or a "photo-video (PV) camera," and may include the HR camera. The third camera 265 may include a color camera having functions for acquiring a high-quality image, such as, for example, an automatic focus (AF) function and an optical image stabilizer (OIS). However, examples of the third camera 265 are not limited thereto, and may include a GS camera or an RS camera.

In an embodiment, at least one sensor (not shown) (e.g., a gyro sensor, an acceleration sensor, a geomagnetic sensor, and/or a gesture sensor), the first cameras 245a and 245b may perform at least one of head tracking for 6DoF, pose estimation and prediction, gesture and/or spatial recognition, and a SLAM function through depth imaging.

In an embodiment, the first cameras 245a and 245b may be classified and used as a camera for head tracking and a camera for hand tracking.

In an embodiment, the lighting units 230a and 230b may be used differently according to positions to which the lighting units 230a and 230b are attached. For example, the lighting units 230a and 230b may be attached around a hinge (e.g., the first hinge 240a and the second hinge 240b) connecting a frame (e.g., a rim) and a temple, or be attached around a first camera (e.g., 245a and 245b) mounted adjacent to a bridge connecting the frame. For example, when a GS camera is used to capture an image, the lighting units 230a and 230b may be used to supplement a surrounding brightness. For example, the lighting units 230a and 230b may be used in a dark environment or when it is not easy to detect an object to be captured due to a mixture or a reflection of various light sources.

The lighting units 230a and 230b attached around the frame of the wearable AR device 200 may be used as an auxiliary means for facilitating gaze detection when the pupils are captured using the second cameras 275a and 275b. When the lighting units 230a and 230b are used as the auxiliary means for detecting the gaze direction, they may include an IR LED with an IR light wavelength.

In an embodiment, a PCB (e.g., the first PCB 235a and the second PCB 235b) may include a processor (not shown) configured to control components of the wearable AR device 200, a memory (not shown), and a communication module (not shown). The communication module may be configured the same as the communication module 190 of FIG. 1, and the description of the communication module 190 provided above with reference to FIG. 1 may be applicable hereto. For example, the communication module may establish a direct (or wired) communication channel or wireless communication channel between the wearable AR device 200 and an external electronic device, and support communication through the established communication channel. The PCB may transmit an electrical signal to the components included in the wearable AR device 200.

The communication module (not shown) may include one or more communication processors that are operable independently of the processor and that support direct (e.g., wired) communication or wireless communication. According to an embodiment, the communication module may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with an external electronic device via a short-range communication network, such as Bluetooth™, wireless-fidelity (Wi-Fi) direct, or infrared data association (IrDA)) or a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., a multi-chip) separate from each other.

The wireless communication module may support a 5G network after a 4G network, and next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., a mmWave band) to achieve, e.g., a high data transmission rate. The wireless communication module may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna.

The wearable AR device 200 may further include an antenna module (not shown). The antenna module, comprising at least one antenna, may transmit or receive a signal or power to or from the outside (e.g., an external electronic device) of the wearable AR device 200. According to an embodiment, the antenna module may include an antenna including a radiating element including a conductive material or a conductive pattern formed in or on a substrate (e.g., the first PCB 235a and the second PCB 235b). According to an embodiment, the antenna module may include a plurality of antennas (e.g., an antenna array).

In an embodiment, a plurality of microphones (e.g., the first microphone 250a, the second microphone 250b, and the third microphone 250c) may process an external sound signal into electrical audio data. The audio data may be used in various ways according to a function (or application) being performed (or executed) in the wearable AR device 200.

In an embodiment, a plurality of speakers (e.g., the first speaker 255a and the second speaker 255b) may output audio data received from the communication module or stored in the memory.

In an embodiment, the battery 260 may be provided as one or more batteries and may supply power to the components included in the wearable AR device 200.

In an embodiment, the visors 270a and 270b may adjust a transmitted amount of external light incident on the eyes of the user based on a transmittance. The visors 270a and 270b may be disposed on a front or rear side of the screen display portions 215a and 215b. The front side of the screen display portions 215a and 215b may indicate a direction opposite to a user's side of the user wearing the wearable AR device 200, and the rear side of the screen display portions 215a and 215b may indicate a direction of the user's side of the user wearing the wearable AR device 200. The visors 270a and 270b may protect the screen display portions 215a and 215b and adjust the transmitted amount of the external light. For example, the visors 270a and 270b may each include an electrochromic device that changes in color according to applied power and adjusts the transmittance. Electrochromism refers to a phenomenon in which color changes in response to an occurrence of an oxidation-reduction reaction by applied power. The visors 270a and 270b may adjust the transmittance of the external light using the color change of the electrochromic device.

For example, the visors 270a and 270b may each include a control module and an electrochromic device. The control module may control the electrochromic device to adjust the transmittance of the electrochromic device. Each "module" herein may comprise circuitry.

Figure 3:
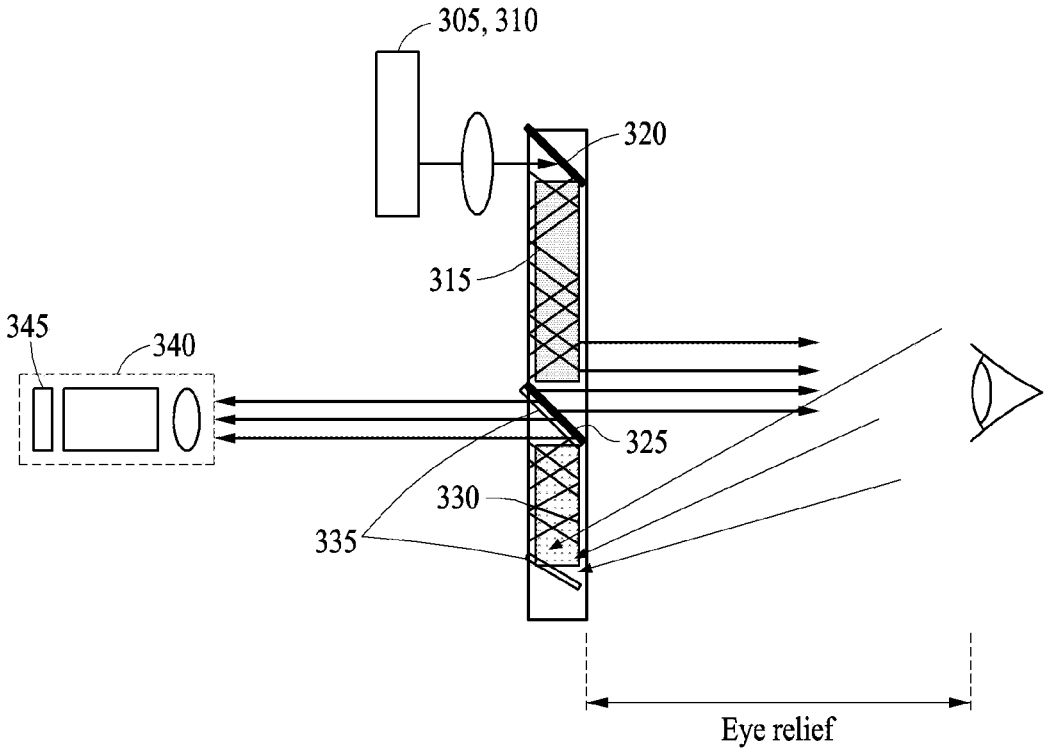
FIG. 3 is a diagram illustrating an example camera and an example eye-tracking (ET) sensor of a wearable AR device according to an example embodiment.

FIG. 3 is a diagram illustrating an example camera and an example ET sensor of a wearable AR device according to an embodiment.

Referring to FIG. 3, an wearable AR device (e.g., the wearable AR device 200 of FIG. 2) may include displays 305 and 310 (e.g., the displays 205 and 210 of FIG. 2), an optical waveguide (or a waveguide) 315, an optical input member 320 (e.g., the optical input member 220 of FIG. 2), an optical output member 325, an optical ET waveguide (or an ET waveguide) 330, an ET splitter 335, a camera 340 (e.g., the second cameras 275a and 275b of FIG. 2), an ET sensor 345, and a lighting unit (e.g., the lighting units 230a and 230b of FIG. 2).

Referring to FIG. 3, light output from the displays 305 and 310 of the wearable AR device may be transmitted to eyes of a user from the optical output member 325 after being input to the optical input member 320 and passing through the optical waveguide 315.

Referring to FIG. 3, the camera 340 may acquire an eye image of the user. For example, the eye image of the user may be transmitted to the ET splitter 335 on an upper side by being input to the ET splitter 335 on a lower side and passing through the ET optical waveguide 330. The camera 340 may acquire the eye image of the user from the ET splitter 335 on the upper side.

The lighting unit may output IR light to an area of pupils of the user. The IR light may be reflected from the pupils of the user and transmitted to the ET splitter 335 together with the eye image of the user. The eye image of the user acquired by the camera 340 may include the reflected IR light. The ET sensor 345 may sense the IR light reflected from the pupils of the user.

Figure 4:
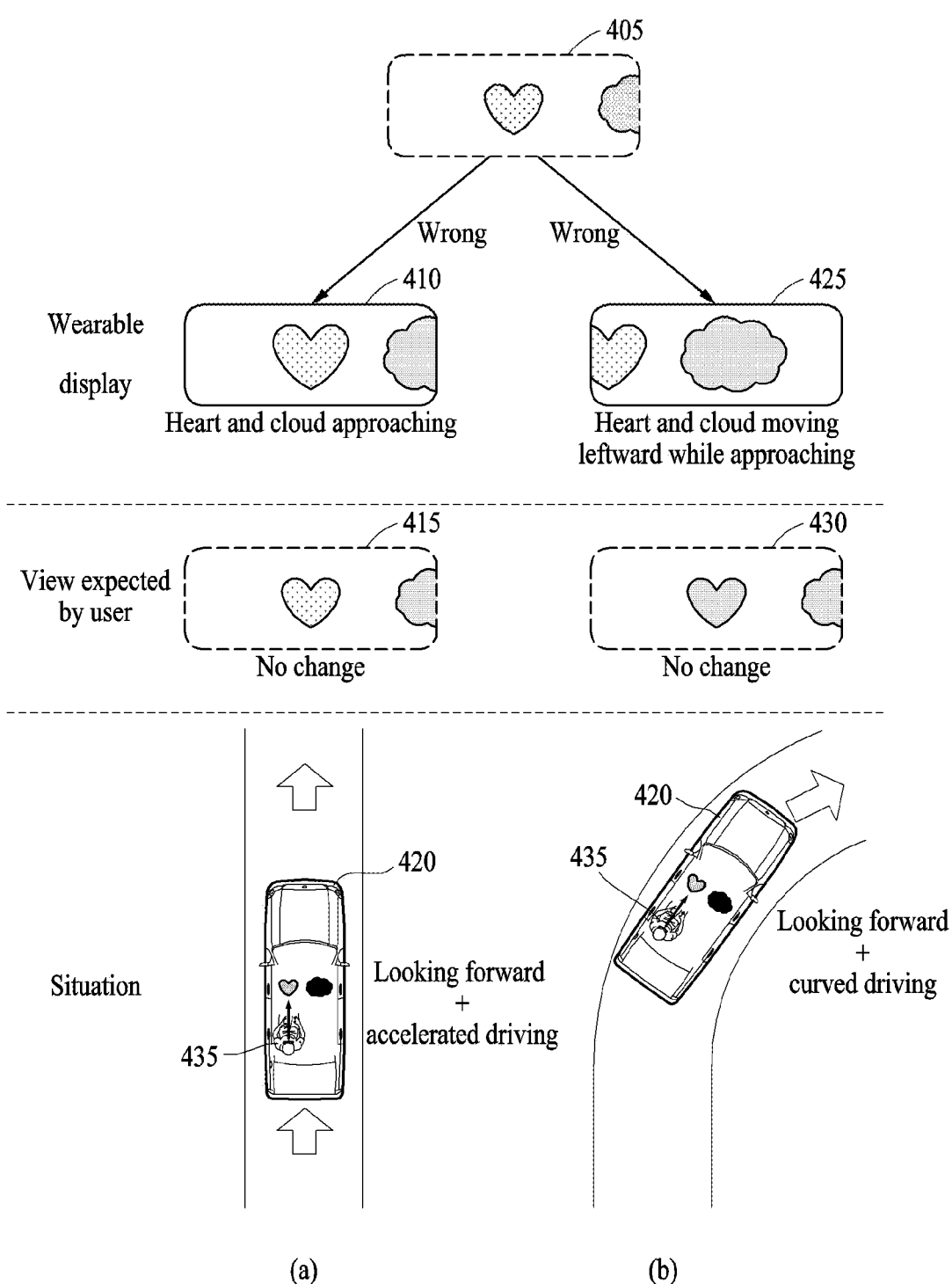
FIG. 4 is a diagram illustrating example AR contents that move according to a movement of a vehicle when a wearable AR device is used in the vehicle according to an example embodiment.

FIG. 4 is a diagram illustrating example AR contents that move according to a movement of a vehicle when a wearable AR device is used in the vehicle according to an embodiment.

A wearable AR device (e.g., the wearable AR device 200 of FIG. 2) such as AR (eye) glasses may be a next-generation device that displays a virtual image (e.g., information of objects) over an actual image viewed by a user wearing the wearable AR device. For example, the wearable AR device may be a head-mounted display (HMD). However, it is provided merely as an example, and the wearable AR device may be an AR device of various types. The wearable AR device may include a camera (e.g., the first cameras 245a and 245b of FIG. 2) that recognizes the surroundings thereof, a sensor, and an optical display that analyzes information acquired through the camera and the sensor and displays an AR content on an actual screen viewed by the user.

A user may wear a wearable device on their face. The wearable device may perform vision processing, such as, for example, simultaneous localization and mapping (SLAM), head tracking, hand tracking, and surface reconstruction, based on data acquired using a camera and a sensor, and may overlap an AR content in a real environment to provide it to the user.

The wearable AR device may generate spatial map data corresponding to a corresponding space in an arbitrary space to which information is not given through various sensors such as a camera, a global positioning system (GPS), a gyro sensor, and/or an acceleration sensor, and determine a position of the user.

The wearable AR device may generate the spatial map data corresponding to the space viewed by the user in the form of a mesh, for example. The spatial map data may be initially generated for a certain space and may be generated each time a new space appears.

The wearable AR device may determine a portion of the spatial map data to be provided to the user based on a current position of the wearable AR device and a current direction the wearable AR device faces on the spatial map data that is determined through various sensors such as the camera, the GPS, the gyro sensor, and/or the acceleration sensor. The user is wearing the wearable AR device, and thus the current position of the wearable AR device may be a current position of the user and the current direction the wearable AR device faces may be a current direction of a gaze of the user.

When the user wearing the wearable AR device moves or a direction of the gaze of the user has changed, the wearable AR device may determine which portion of the generated spatial map data is to be displayed. When the current position and the current direction of the wearable AR device are out of the generated spatial map data, the wearable AR device may update the spatial map data.

The wearable AR device may determine at least one of the current position or the current direction of the wearable AR device on the spatial map data, using an image acquired through the camera. The current position and the current direction of the wearable AR device determined using the image acquired through the camera may, however, be inaccurate. To compensate for this, the wearable AR device may use an inertial measurement unit (IMU). An inertia value measured by the IMU may also have an error, but the camera and the IMU may be used together for a mutual complement.

The IMU may include an acceleration sensor, a gyro sensor, and a geomagnetic sensor. The inertia value may refer to a value output from the IMU. For example, the inertia value may include values of roll, pitch, and yaw. The wearable AR device may adjust the current position and the current direction of the wearable AR device on the spatial map data based on the inertia value, and output an AR content based on at least one of the adjusted current position or the adjusted current direction of the wearable AR device.

The wearable AR device may be used in a vehicle such as an automobile and a train. For example, the user may use the wearable AR device while on board an automobile or a train. However, an automobile and a train are provided merely as examples of the vehicle, and the vehicle may be of any one of various types of transportation available for the user.

Since the vehicle moves, the inertia value of the IMU may change by the movement of the vehicle even through the user does not move inside the vehicle, and the wearable AR device may recognize that the user moves in such a case. When the wearable AR device determines the current position and the current direction of the wearable AR device on the spatial map data using only the camera and the IMU, the wearable AR device may output an AR content that does not correspond to an actual movement of the user, causing inconvenience to the user.

When the user moves in the vehicle, a new space that was not visible when an initial spatial map was generated may begin to be visible, and the wearable AR device may update the spatial map data each time such a new space is viewed. Thus, great computing resources may be consumed.

For example, referring to FIG. 4, illustrated are examples of how an AR content 405 including virtual objects is output to a display of the wearable AR device as a vehicle 420 moves.

In a situation of (a) illustrated in FIG. 4 in which a user 435 wearing the wearable AR device looks forward and the vehicle 420 travels straight forward, the user 435 and the wearable AR device may not move, and the user 435 may thus expect that the AR content 405 previously output would be output without a change at a current point in time, as in an AR content 415. The wearable AR device may recognize such a straight movement of the vehicle 420 and output an AR content 410 showing virtual objects approaching the user 435. The AR content 410 may not correspond to the movement of the wearable AR device and the user 435, failing to achieve the purpose of providing an AR content.

Similarly, in a situation of (b) illustrated in FIG. 4 in which the user 435 wearing the wearable AR device looks forward and the vehicle 420 turns a curve, the user 435 may expect that the AR content 405 previously output would be output without a change at a current point in time, as in an AR content 430. The wearable AR device may recognize such a curved movement of the vehicle 420 and output an AR content 425 showing virtual objects approaching the left side of the user 435. The AR content 425 may not correspond to the movement of the wearable AR device and the user 435, failing to achieve the purpose of providing an AR content.

Each embodiment herein may be used in combination with any other embodiment described herein.

According to an embodiment, the wearable AR device may operate based on whether the wearable AR device is in a space of the vehicle 420. Whether the wearable AR device is in the space of the vehicle 420 may be determined manually as the user 435 selects as such or determined automatically as described below with reference to FIG. 5.

The manual determination will be described below with reference to FIG. 18.

In the case of the automatic determination, the wearable AR device may determine whether the wearable AR device is in the space of the vehicle 420 based on at least one of information received from the vehicle 420 or a value measured using at least one sensor of the wearable AR device.

In an embodiment, when it is determined that the wearable AR device is not in the space of the vehicle 420, the wearable AR device may output an AR content corresponding to a space around the wearable AR device based on the value measured using the at least one sensor of the wearable AR device.

For example, when it is determined that the wearable AR device is not in the space of the vehicle 420, the wearable AR device may determine at least one of a current position or a current direction of the wearable AR device on spatial map data corresponding to a space in which the wearable AR device is present, based on the value measured using the at least one sensor of the wearable AR device, and output an AR content corresponding to the current position and the current direction of the wearable AR device determined on the spatial map data.

When it is determined that the wearable AR device is in the space of the vehicle 420, the wearable AR device may determine whether there are anchor devices capable of communicating with the wearable AR device. When there are the anchor devices capable of communication, the wearable AR device may output an AR content corresponding to a space of the vehicle 420 around the wearable AR device by communicating with the anchor devices.

An anchor device used herein may refer to a device that may determine a positional relationship such as a distance, an angle, and/or a direction between the wearable AR device and the anchor device by communicating with the wearable AR device. For example, the anchor device may be an ultra-wideband (UWB) device that may transmit and receive an UWB signal.

The anchor devices may be registered in the wearable AR device.

For example, when there are anchor devices capable of communicating with the wearable AR device in the space of the vehicle 420, the wearable AR device may receive a signal transmitted from the anchor devices. When receiving the signal transmitted from the anchor devices, the wearable AR device may determine the presence of the anchor devices capable of communication.

For example, when there are anchor devices capable of communicating with the wearable AR device in the space of the vehicle 420, the anchor devices may receive a signal transmitted from the wearable AR device and transmit an anchor response signal in response to the signal transmitted from the wearable AR device. When receiving the response signal from the anchor devices, the wearable AR device may determine the presence of the anchor devices capable of communication.

When it is determined that the wearable AR device is in the space of the vehicle 420, the wearable AR device may determine whether there are anchor devices capable of communicating with the wearable AR device. When it is determined that there are the anchor devices capable of communication, the wearable AR device may determine at least one of the current position of the wearable AR device or the current direction the wearable AR device faces on the first spatial map data corresponding to the space of the vehicle 420 by communicating with the anchor devices, and output an AR content corresponding to the current position and the current direction of the wearable AR device determined on the first spatial map data.

According to an embodiment, based on whether the wearable AR device is in the space of the vehicle 420, the wearable AR device may provide an AR content corresponding to a movement of the wearable AR device in a space in which the wearable AR device is present.

Hereinafter, an AR content providing method will be described with reference to FIG. 5.

Figure 5:
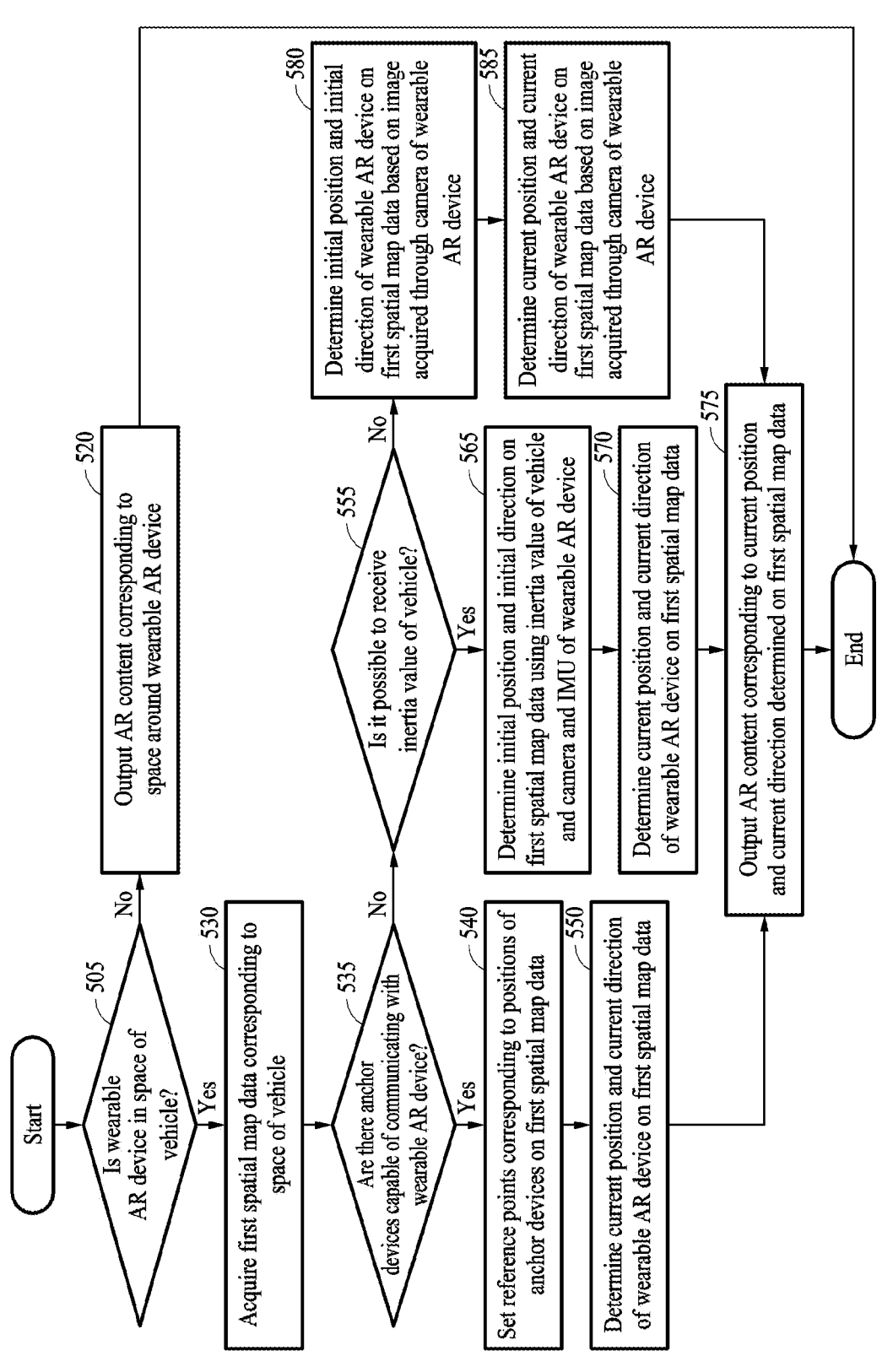
FIG. 5 is a flowchart illustrating an example AR content providing method according to an example embodiment.

FIG. 5 is a flowchart illustrating an example AR content providing method according to an embodiment.

Referring to FIG. 5, in operation 505, a wearable AR device (e.g., the wearable AR device 200 of FIG. 2) may determine whether the wearable AR device is in a space of a vehicle (e.g., the vehicle 420 of FIG. 4). For example, the wearable AR device may determine whether the wearable AR device is in the space of the vehicle based on at least one of information received from the vehicle or a value measured using at least one sensor of the wearable AR device. Operation 505 will be described in detail below with reference to FIGS. 6 through 9.

In operation 520, when it is determined in operation 505 that the wearable AR device is not in the space of the vehicle, the wearable AR device may output an AR content corresponding to a space around the wearable AR device based on the value measured using the at least one sensor of the wearable AR device.

For example, the wearable AR device may determine at least one of a current position of the wearable AR device or a current direction the wearable AR device faces on spatial map data corresponding to a space in which the wearable AR device is present, based on the value measured using the at least one sensor of the wearable AR device.

In this example, the wearable AR device may output the AR content corresponding to the current position and the current direction of the wearable AR device on the spatial map data of the space around the wearable AR device.

In operation 530, when it is determined in operation 505 that the wearable AR device is in the space of the vehicle, the wearable AR device may acquire first spatial map data corresponding to the space of the vehicle.

For example, the wearable AR device may generate second spatial map data corresponding to a space of the vehicle around the wearable AR device within the space of the vehicle.

The wearable AR device may determine whether there is third spatial map data previously generated for the space of the vehicle. When there is the third spatial map data, the wearable AR device may generate the first spatial map data by combining the third spatial map data and the second spatial map data.

The wearable AR device may determine whether there is spatial information about the space of the vehicle. For example, the spatial information may include information about dimensions of the space of the vehicle and components such as a seat included in the space. When there is the spatial information, the wearable AR device may transform the spatial information into fourth spatial map data, and combine the fourth spatial map data and the second spatial map data to generate the first spatial map data.

The wearable AR device may generate the first spatial map data by combining the fourth spatial map data transformed from the spatial information, the third spatial map data previously generated for the space of the vehicle, and the second spatial map data.

When there is no spatial information, the wearable AR device may use the second spatial map data as the first spatial map data corresponding to the space of the vehicle.

As the wearable AR device generates the first spatial map data based on the second spatial map data, the third spatial map data, and the fourth spatial map data, the wearable AR device may secure spatial map data of the entire space of the vehicle immediately after a user gets on the vehicle, and reduce the number of cases in which the current position and the current direction of the wearable AR device deviate from the first spatial map data and reduce the number of updates of the first spatial map data.

Operation 530 will be described in detail below with reference to FIGS. 16 and 17.

In operation 535, the wearable AR device may determine whether there are anchor devices of the vehicle capable of communicating with the wearable AR device. The anchor devices may be used to determine a position of the wearable AR device and a direction in the wearable AR device faces. An anchor device may be, for example, a UWB device that transmits and receives a UWB signal.

The anchor devices may be registered in the wearable AR device.

For example, when there are anchor devices capable of communicating with the wearable AR device in the space of the vehicle 420, the wearable AR device may receive a signal transmitted from the anchor devices. When receiving the signal transmitted from the anchor devices, the wearable AR device may then determine the presence of the anchor devices capable of communication.

For example, when there are anchor devices capable of communicating with the wearable AR device in the space of the vehicle 420, the anchor devices may receive a signal transmitted from the wearable AR device and transmit an anchor response signal in response to the signal transmitted from the wearable AR device. When receiving the response signal from the anchor devices, the wearable AR device may then determine the presence of the anchor devices capable of communication.

In operation 540, when it is determined in operation 535 that there are anchor devices capable of communicating with the wearable AR device, the wearable AR device may set reference points corresponding to positions of the anchor devices on the first spatial map data.

For example, while the vehicle is in a stationary state, the wearable AR device may determine an initial positional relationship between the wearable AR device and the anchor devices by communicating with the anchor devices. The initial positional relationship may include, for example, an initial distance and an initial angle between the wearable AR device and the anchor devices. The wearable AR device may determine points corresponding to the positions of the anchor devices on the first spatial map data based on the value measured using the at least one sensor of the wearable AR device and the initial positional relationship, and may set the determined points as the reference points.

For example, the wearable AR device may receive a user input for determining points on the first spatial map data corresponding to the positions of the anchor devices, determine the points based on the user input, and set the determined points as the reference points.

The wearable AR device may determine a positional relationship with the anchor devices by setting the reference points at the points corresponding to the positions of the anchor devices on the first spatial map data, and may thereby differentiate between a movement of the vehicle and a movement of the user wearing the wearable AR device.

In operation 550, the wearable AR device may determine a current positional relationship between the wearable AR device and the anchor devices, and may determine the current position and the current direction of the wearable AR device on the first spatial map data based on the current positional relationship and the reference points. Operation 550 will be described in detail below with reference to FIG. 12.

In operation 575, the wearable AR device may output an AR content corresponding to the current position and the current direction of the wearable AR device that are determined on the first spatial map data.

For example, in the situation of (a) illustrated in FIG. 4, a positional relationship between the anchor devices in the vehicle and the user wearing the wearable AR device may not change even when the vehicle moves, and thus the wearable AR device may output the AR content 415 at the same position as the previous AR content 405.

In operation 555, when it is determined in operation 535 that there are no anchor devices capable of communicating with the wearable AR device, the wearable AR device may determine whether it is possible to receive an inertia value of the vehicle from at least one of the vehicle or an electronic device present in the space of the vehicle.

When it is determined in operation 555 that it is possible to receive the inertia value of the vehicle, the wearable AR device may correct an inertia value measured through an IMU of the wearable AR device based on the inertia value of the vehicle.

For example, when the vehicle is moving, the inertia value measured through the IMU of the wearable AR device may include an inertia value by the movement of the vehicle, and thus the wearable AR device may correct an inertia value of the wearable AR device based on a difference between the inertia value measured through the IMU of the wearable AR device and the inertia value of the vehicle. A method of correcting an inertia value will be described in detail below with reference to FIG. 14.

In operation 565, the wearable AR device may determine an initial position of the wearable AR device and an initial direction the wearable AR device faces on the first spatial map data based on an image acquired through a camera of the wearable AR device and on the corrected inertia value.

In operation 570, the wearable AR device may determine at least one of a current position or a current direction of the wearable AR device on the first spatial map data, based on the inertia value of the vehicle, the inertia value of the wearable AR device, and the initial position and the initial direction of the wearable AR device on the first spatial map data.

For example, when the vehicle moves, the wearable AR device may determine an inertia value by a movement of the user wearing the wearable AR device by correcting the inertia value of the wearable AR device based on the difference between the inertia value measured through the IMU of the wearable AR device and the inertia value of the vehicle. The wearable AR device may apply the determined inertia value by the movement of the user to the initial position and the initial direction of the wearable AR device on the first spatial map data to determine at least one of the current position or the current direction of the wearable AR device on the first spatial map data.

Operation 570 will be described in detail below with reference to FIG. 15.

In operation 575, the wearable AR device may output an AR content corresponding to the current position and the current direction of the wearable AR device determined on the first spatial map data.

In operation 580, when it is determined in operation 555 that it is not possible to receive the inertia value of the vehicle, the wearable AR device may determine an initial position of the wearable AR device and an initial direction the wearable AR device faces on the first spatial map data, based on an image acquired through the camera of the wearable AR device.

In operation 585, the wearable AR device may determine a current position of the wearable AR device and a current direction the wearable AR device faces on the first spatial map data, based on an image acquired through the camera of the wearable AR device.

For example, the wearable AR device may determine a second variation in position and direction of the wearable AR device using an image acquired through the camera and apply the second variation to the initial position and the initial direction of the wearable AR device on the first spatial map data to determine the current position and the current direction of the wearable AR device on the first spatial map data.

In operation 575, when the current position and the current direction of the user on the first spatial map data are determined in operation 585, the wearable AR device may output an AR content corresponding to the current position and the current direction of the user determined on the first spatial map data.

In an embodiment, operations 580, 585, and 575 may be performed when it is determined in operation 535 that there are no anchor devices capable of communicating with the wearable AR device.

In an embodiment, the wearable AR device may be connected to another electronic device (e.g., the electronic device 101 of FIG. 1), and operations 505, 520, 530, 535, 540, 550, 555, 565, 570, 575, 580, and 585 may be performed by the electronic device connected to the wearable AR device. For example, the wearable AR device may transmit information acquired through sensors of the wearable AR device to the electronic device connected to the wearable AR device, and the electronic device connected, directly or indirectly, to the wearable AR device may process the information transmitted from the wearable AR device and perform the AR content providing method described herein.

Figure 6:
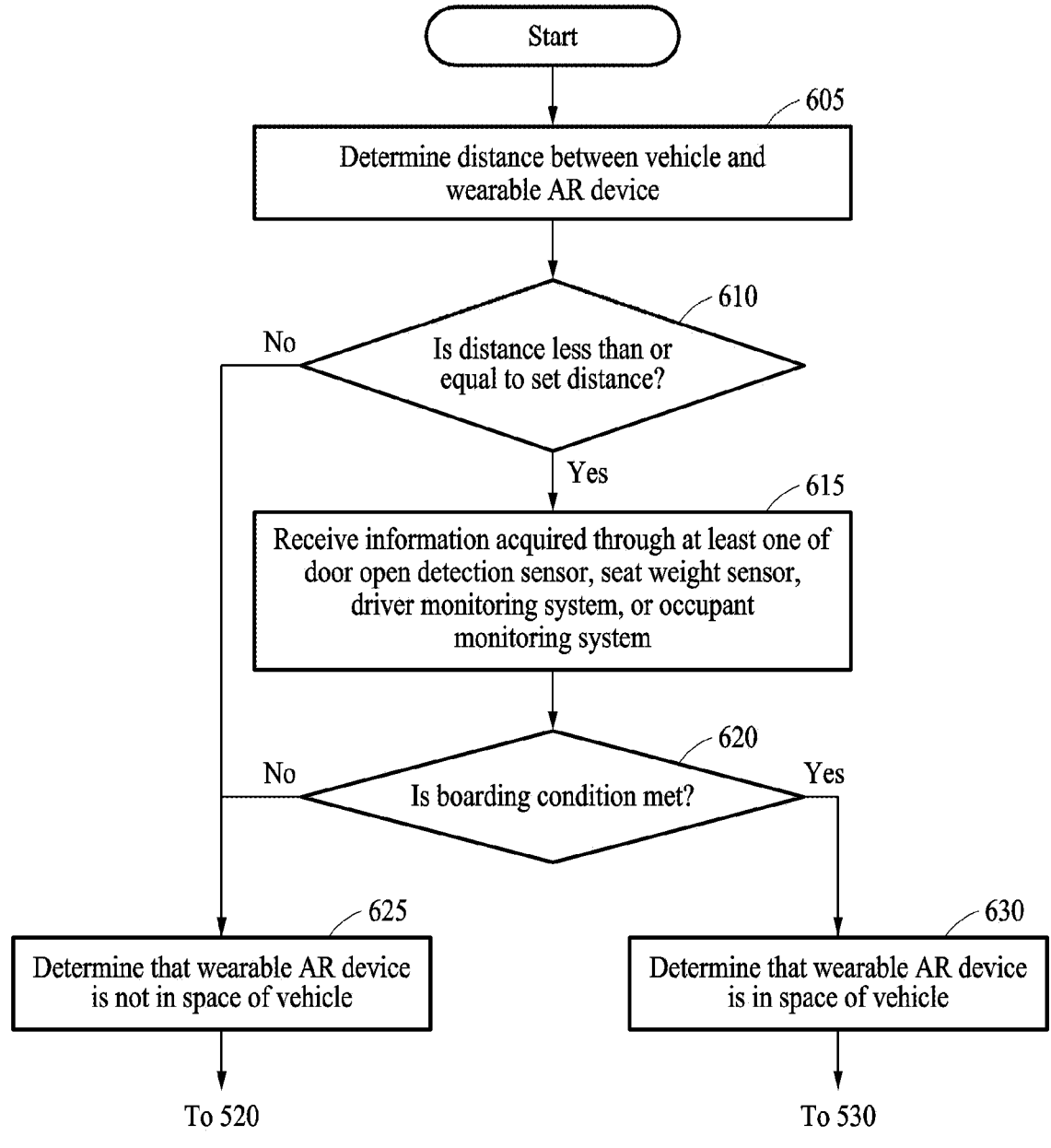
FIG. 6 is a flowchart illustrating an example operation of determining whether a wearable AR device is in a space of a vehicle according to an example embodiment.

FIG. 6 is a flowchart illustrating an example operation of determining whether a wearable AR device is in a space of a vehicle according to an embodiment.

According to an embodiment, operations to be described hereinafter with reference to FIG. 6 may be included in operation 505 described above with reference to FIG. 5.

In operation 605, a wearable AR device (e.g., the wearable AR device 200 of FIG. 2) may determine a distance between a vehicle and the wearable AR device. For example, when there is an anchor device in the vehicle, the wearable AR device may determine the distance between the vehicle and the wearable AR device by communicating with the anchor device.

In operation 610, the wearable AR device may determine whether the determined distance is less than or equal to a set distance. In operation 625, when the determined distance exceeds the set distance, the wearable AR device may determine that the wearable AR device is not in a space of the vehicle.

In operation 615, when the determined distance is less than or equal to the set distance, the wearable AR device may receive, from the vehicle, information acquired through at least one of a vehicle door open detection sensor, a seat weight sensor, a driver monitoring system (DMS), or an occupant monitoring system (OMS) of the vehicle. The DMS may be a system that visually monitors a current state of a driver of the vehicle by, for example, determining whether the driver is on board and tracking a pupil state, eye blinking, and a gaze of the driver. The OMS may be a system that visually monitors whether an occupant is on board, a seat of the occupant, and a state of the occupant.

In operation 620, the wearable AR device may determine whether a boarding condition is met based on the received information.

For example, when the wearable AR device receives information about a door open detection result and a seat weight change from the vehicle, the wearable AR device may determine whether the door is opened from outside and there is a change in seat weight in a corresponding area, as the boarding condition. In this example, when the door is opened from outside and the seat weight in the area changes, the wearable AR device may determine that the boarding condition is met. When the door is opened from inside or the seat weight in the area does not change, the wearable AR device may determine that the boarding condition is not met.

In an embodiment, the wearable AR device may determine whether a new occupant is detected in the vehicle, as the boarding condition, from information acquired through the DMS and the OMS. In this example, the wearable AR device may determine that the boarding condition is met when the new occupant is detected in the vehicle, and may determine that the boarding condition is not met when the new occupant is not detected in the vehicle.

In operation 625, when it is determined in operation 620 that the boarding condition is not met, the wearable AR device may determine that the wearable AR device is not in the space of the vehicle. When it is determined that the wearable AR device is not in the space of the vehicle, the wearable AR device may output an AR content corresponding to a space around the wearable AR device based on a value measured using at least one sensor of the wearable AR device, in operation 520.

In operation 630, when it is determined in operation 620 that the boarding condition is met, the wearable AR device may determine that the wearable AR device is in the space of the vehicle. When it is determined that the wearable AR device is in the space of the vehicle, the wearable AR device may acquire first spatial map data corresponding to the space of the vehicle, in operation 530.

Figure 7:
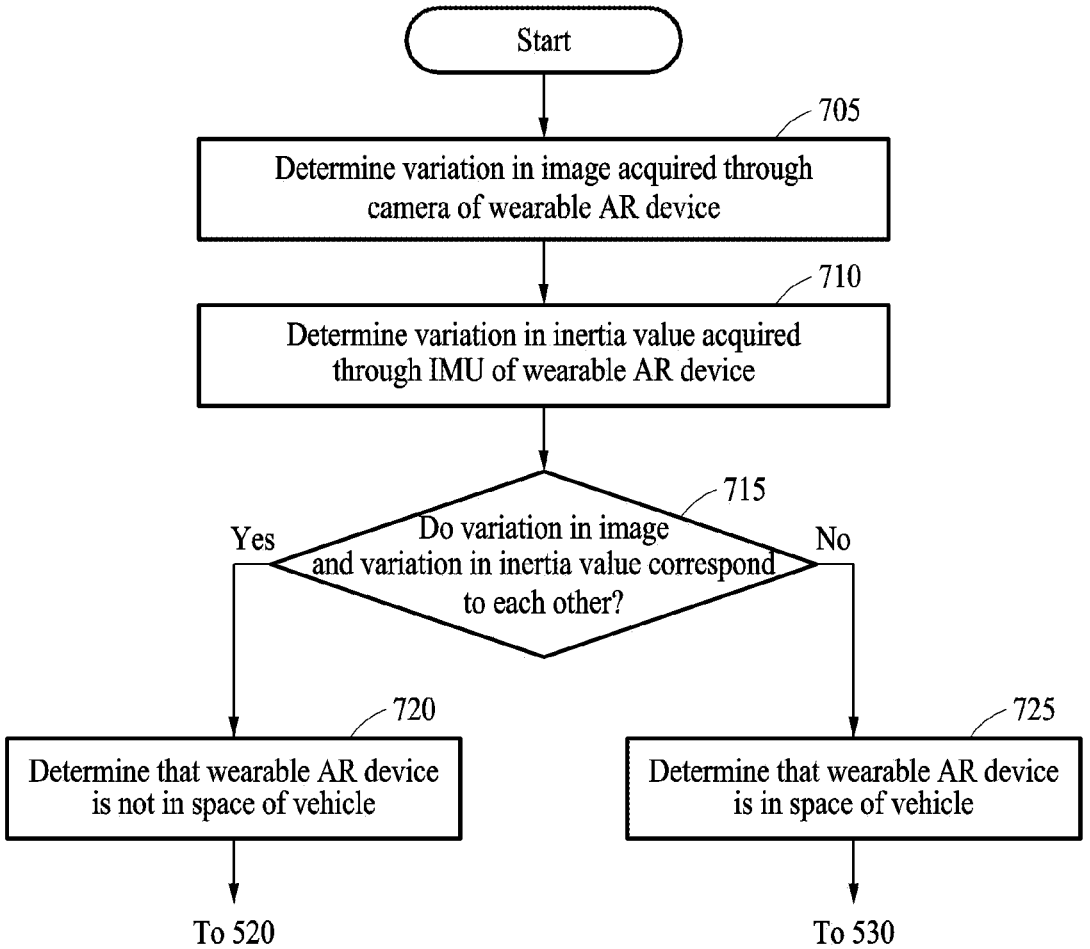
FIG. 7 is a flowchart illustrating an example operation of determining whether a wearable AR device is in a space of a vehicle according to another example embodiment.

FIG. 7 is a flowchart illustrating an example operation of determining whether a wearable AR device is in a space of a vehicle according to an embodiment.

According to an embodiment, operations to be described hereinafter with reference to FIG. 7 may be included in operation 505 described above with reference to FIG. 5.

In operation 705, a wearable AR device (e.g., the wearable AR device 200 of FIG. 2) may determine a variation in an image acquired through a camera of the wearable AR device. In operation 710, the wearable AR device may determine a variation in an inertia value measured through an IMU of the wearable AR device.

In operation 715, the wearable AR device may determine whether the variation in the image and the variation in the inertia value correspond to each other. When a vehicle moves while the wearable AR device is in a space of the vehicle, the inertia value of the IMU of the wearable AR device may change by the movement of the vehicle. The variation in the image acquired through the camera of the wearable AR device may not be large if a user does not move in the vehicle even when the vehicle moves.

In operation 720, when it is determined in operation 715 that the variation in the image and the variation in the inertia value correspond to each other, the wearable AR device may determine that the wearable AR device is not in the space of the vehicle. When it is determined that the wearable AR device is not in the space of the vehicle, the wearable AR device may output an AR content corresponding to a space around the wearable AR device based on a value measured using at least one sensor of the wearable AR device, in operation 520.

In operation 725, when it is determined in operation 715 that the variation in the image and the variation in the inertia value do not correspond to each other, the wearable AR device may determine that the wearable AR device is in the space of the vehicle. When it is determined that the wearable AR device is in the space of the vehicle, the wearable AR device may acquire first spatial map data corresponding to the space of the vehicle, in operation 530.

Figure 8:
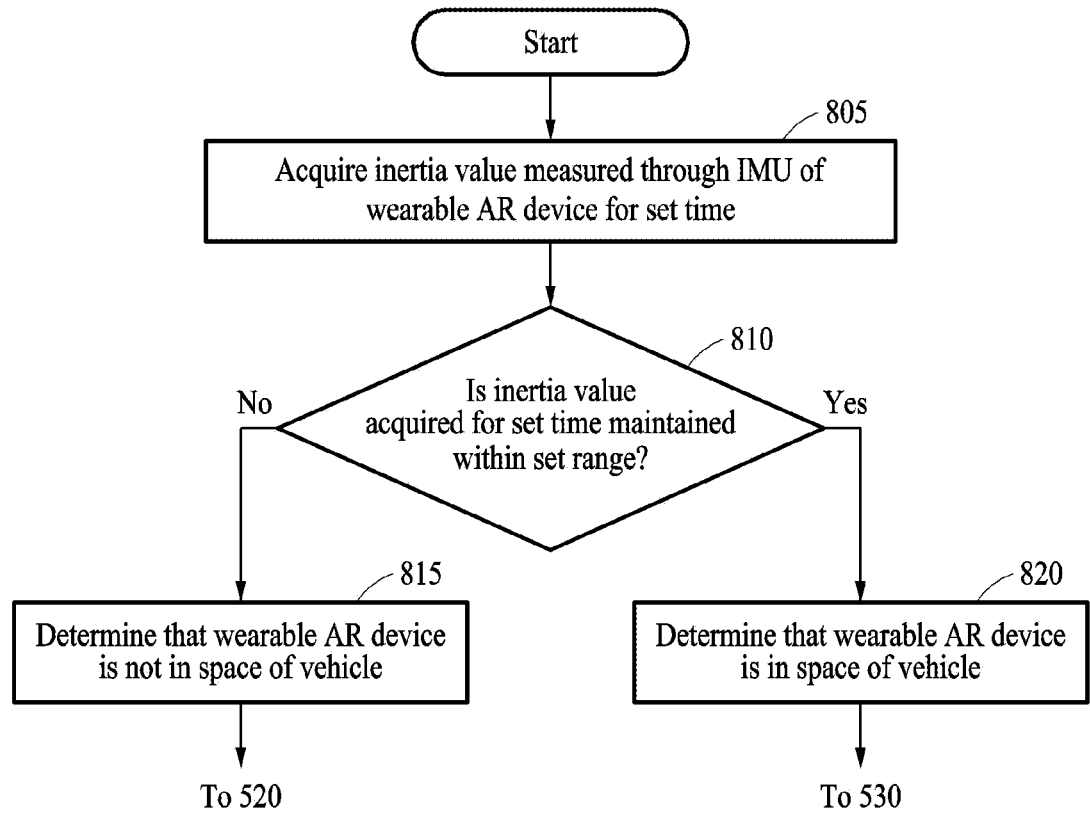
FIG. 8 is a flowchart illustrating an example operation of determining whether a wearable AR device is in a space of a vehicle according to still another example embodiment.

FIG. 8 is a flowchart illustrating an example operation of determining whether a wearable AR device is in a space of a vehicle according to still another embodiment.

According to an embodiment, operations to be described hereinafter with reference to FIG. 8 may be included in operation 505 described above with reference to FIG. 5.

In operation 805, a wearable AR device (e.g., the wearable AR device 200 of FIG. 2) may acquire an inertia value measured through an IMU of the wearable AR device for a set time.

In operation 810, the wearable AR device may determine whether the inertia value acquired for the set time is maintained within a set range. For example, when a vehicle travels without stopping for the set time, the inertia value may be maintained within the set range for the set time. For example, the inertia value may include a speed of the vehicle, and thus, when the vehicle moves, the speed may be maintained within the set range for the set time.

In operation 815, when it is determined in operation 810 that the inertia value acquired for the set time is not maintained within the set range, the wearable AR device may determine that the wearable AR device is not in a space of the vehicle. When it is determined that the wearable AR device is not in the space of the vehicle, the wearable AR device may output an AR content corresponding to a space around the wearable AR device based on a value measured using at least one sensor of the wearable AR device, in operation 520.

In operation 820, when it is determined in operation 810 that the inertia value acquired for the set time is maintained within the set range, the wearable AR device may determine that the wearable AR device is in the space of the vehicle. When it is determined that the wearable AR device is in the space of the vehicle, the wearable AR device may acquire first spatial map data corresponding to the space of the vehicle, in operation 530.

The embodiments of determining whether the wearable AR device is in the space of the vehicle as described above with reference to FIGS. 6 through 8 may be applied in a mixed manner.

Hereinafter, operations to be performed by the wearable AR device as a user gets on a vehicle will be described with reference to FIG. 9.

Figure 9:
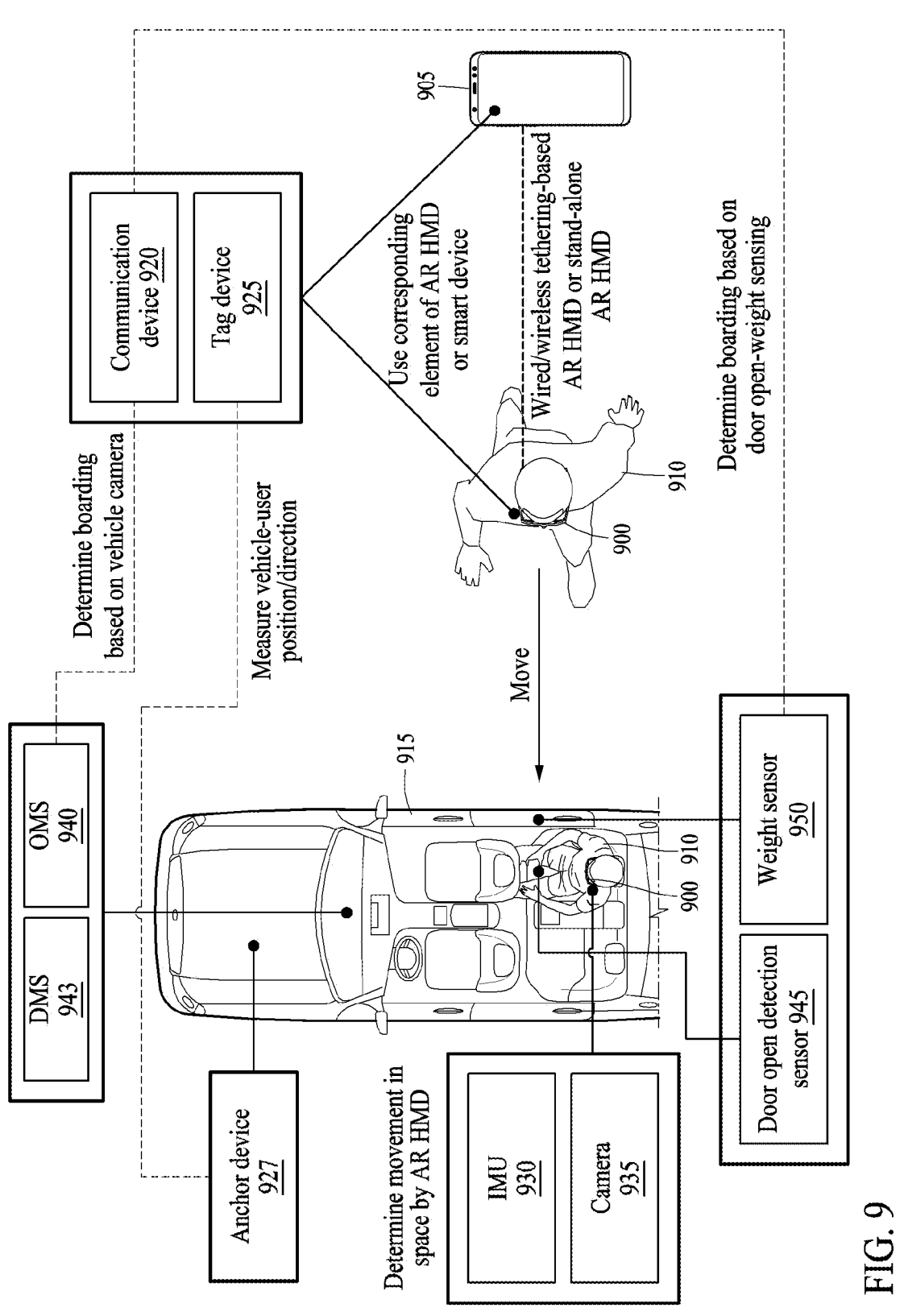
FIG. 9 is a diagram illustrating an example operation performed by a wearable AR device as a user gets on a vehicle according to an example embodiment.

FIG. 9 is a diagram illustrating an example operation performed by a wearable AR device as a user gets on a vehicle according to an embodiment.

Referring to FIG. 9, a user 910 using a wearable AR device 900 (e.g., the wearable AR device 200 of FIG. 2) in a fixed space such as an outdoor space and an indoor space of a building may get on a vehicle 915.

The user 910 may use the wearable AR device 900 in a fixed space such as an outdoor space and an indoor space of a building, and the wearable AR device 900 may determine a current position and a current direction of the user 910 on spatial map data corresponding to the space in which the user 910 is present and may output an AR content corresponding to the current position and the current direction of the user 910 determined on the spatial map data.

The user 910 may move from the fixed space to get on the vehicle 915. The vehicle 915 may be a type of vehicle, such as, for example, an automobile, a train, or an airplane. The vehicle 915 is illustrated as an automobile in FIG. 9 for convenience of description.

According to an embodiment, the wearable AR device 900 may determine whether the wearable AR device 900 is in a space of the vehicle 915. For example, the wearable AR device 900 may determine whether the wearable AR device 900 is in the space of the vehicle 915 based on at least one of information received from the vehicle 915 or a value measured using sensors of the wearable AR device 900.

For example, the wearable AR device 900 may determine a distance between an anchor device 927 of the vehicle 915 and a tag device 925 of the wearable AR device 900. The tag device 925 may be a UWB device that transmits and receives a UWB signal to and from the anchor device 927. For example, the tag device 925 and the anchor device 927 may perform UWB positioning using a propagation time of the UWB signal exchanged with each other or a transmission/reception angle of radio waves.

When the determined distance is less than or equal to a set distance, the wearable AR device 900 may receive, from the vehicle 915 through a communication device 920 of the wearable AR device 900, information acquired through at least one of a door open detection sensor 945, a seat weight sensor 950, a DMS 943, or an OMS 940 of the vehicle 915. The communication device 920 of the wearable AR device 900 may receive the information acquired through at least one of the door open detection sensor 945, the seat weight sensor 950, the DMS 943, or the OMS 940 of the vehicle 915 by communicating directly with the door open detection sensor 945, the seat weight sensor 950, the DMS 943, or the OMS 940 of the vehicle 915 or communicating with a communication device (not shown) of the vehicle 915.

The wearable AR device 900 may determine whether a boarding condition is met based on the received information. For a description of the boarding condition, reference may be made to what has been described above with reference to FIG. 6. In the example of FIG. 9, the wearable AR device 900 may recognize that a new occupant is detected inside the vehicle 915 from information acquired through the OMS 940, and determine that the boarding condition is met. When the boarding condition is met, the wearable AR device 900 may determine that the wearable AR device 900 is in the space of the vehicle 915.

For example, the wearable AR device 900 may compare a variation in an image acquired through a camera 935 of the wearable AR device 900 and a variation in an inertia value measured through an IMU 930 of the wearable AR device 900, and may determine whether they correspond to each other. When the variation in the image acquired through the camera 935 and the variation in the inertia value of the wearable AR device 900 do not correspond to each other, the wearable AR device 900 may determine that the wearable AR device 900 is in the space of the vehicle 915.

For example, the wearable AR device 900 may determine that the boarding condition is met when a weight is sensed from a seat on the side of a door opened from outside, based on information acquired through the door open detection sensor 945 and the weight sensor 950. When the boarding condition is met, the wearable AR device 900 may determine that the wearable AR device 900 is in the space of the vehicle 915.

The wearable AR device 900 may determine whether an inertia value measured for a set time is maintained within a set range. As the vehicle 915 moves after the user 910 gets on the vehicle 915, an inertia value measured through the IMU 930 of the wearable AR device 900 may be maintained within the set range for the set time. When the inertia value of the wearable AR device 900 is maintained within the set range for the set time, the wearable AR device 900 may determine that the wearable AR device 900 is in the space of the vehicle 915.

The wearable AR device 900 may analyze the image acquired through the camera 935, and determine that the wearable AR device 900 is in the space of the vehicle 915 based on a result of the analysis.

The user 910 on board the vehicle 915 may manually input whether the wearable AR device 900 is in the space of the vehicle 915. The wearable AR device 900 may determine whether the wearable AR device 900 is in the space of the vehicle 915 based on the input from the user 910. For example, when the user 910 touches a glass frame of the wearable AR device 900, the wearable AR device 900 may determine that the wearable AR device 900 is in the space of the vehicle 915.

According to an embodiment, the wearable AR device 900 may be connected, directly or indirectly, to another electronic device 905 (e.g., the electronic device 101 of FIG. 1) of the user 910. The communication device 920 and the tag device 925 may be included in at least one of the wearable AR device 900 or the electronic device 905. The electronic device 905 may determine whether the wearable AR device 900 is in the space of the vehicle 915.

For example, the electronic device 905 may determine whether the wearable AR device 900 is in the space of the vehicle 915 based on at least one of the information received from the vehicle 915, a value measured using sensors of the wearable AR device 900, or a value measured using sensors of the electronic device 905.

For example, the electronic device 905 may determine a distance between the vehicle 915 and the electronic device 905 using the anchor device 927 of the vehicle 915 and a tag device 925 of the electronic device 905. When the determined distance is less than or equal to a set distance, the electronic device 905 may receive, from the vehicle 915 through a communication device 920 of the electronic device 905, information acquired through at least one of the door open detection sensor 945, the seat weight sensor 950, the DMS 943, or the OMS of the vehicle 915. The communication device 920 of the electronic device 905 may receive the information acquired through at least one of the door open detection sensor 945, the seat weight sensor 950, the DMS 943, or the OMS of the vehicle 915 by communicating directly with the door open detection sensor 945, the seat weight sensor 950, the DMS 943, or the OMS of the vehicle 915 or communicating with a communication device 920 of the vehicle 915.

The electronic device 905 may determine whether the boarding condition is met based on the received information. For a description of the boarding condition, reference may be made to what has been described above with reference to FIG. 6. In the example of FIG. 9, the electronic device 905 may recognize that a new occupant is detected in the vehicle 915 from information acquired through the OMS 940 and may determine that the boarding condition is met. The electronic device 905 may determine that the wearable AR device 900 is in the space of the vehicle 915.

For example, the electronic device 905 may determine that the boarding condition is met when a weight is sensed from a seat on the side of a door opened from outside, based on information acquired through the door open detection sensor 945 and the weight sensor 950. When the boarding condition is met, the electronic device 905 may determine that the wearable AR device 900 is in the space of the vehicle 915.

The electronic device 905 may receive, from the wearable AR device 900, a variation in an image acquired through the camera 935 of the wearable AR device 900 and a variation in an inertia value measured through the IMU 930 of the wearable AR device 900. The electronic device 905 may compare the variation in the image acquired through the camera 935 of the wearable AR device 900 and the variation in the inertia value of the wearable AR device 900 and may determine whether they correspond to each other. When the variation in the image acquired through the camera 935 of the wearable AR device 900 and the variation in the inertia value of the wearable AR device 900 do not correspond to each other, the electronic device 905 may determine that the wearable AR device 900 is in the space of the vehicle 915.

The electronic device 905 may determine whether the inertia value measured through the IMU 930 of the wearable AR device 900 for a set time is maintained within a set range. As the vehicle 915 moves after the user 910 gets on the vehicle 915, the inertia value measured through the IMU 930 of the wearable AR device 900 may be maintained within the set range for the set time. When the inertia value of the wearable AR device 900 is maintained within the set range for the set time, the electronic device 905 may determine that the wearable AR device 900 is in the space of the vehicle 915.

The electronic device 905 may analyze the image acquired through the camera 935 of the wearable AR device 900 and may determine that the wearable AR device 900 is in the space of the vehicle 915 based on a result of the analysis.

Figure 10:
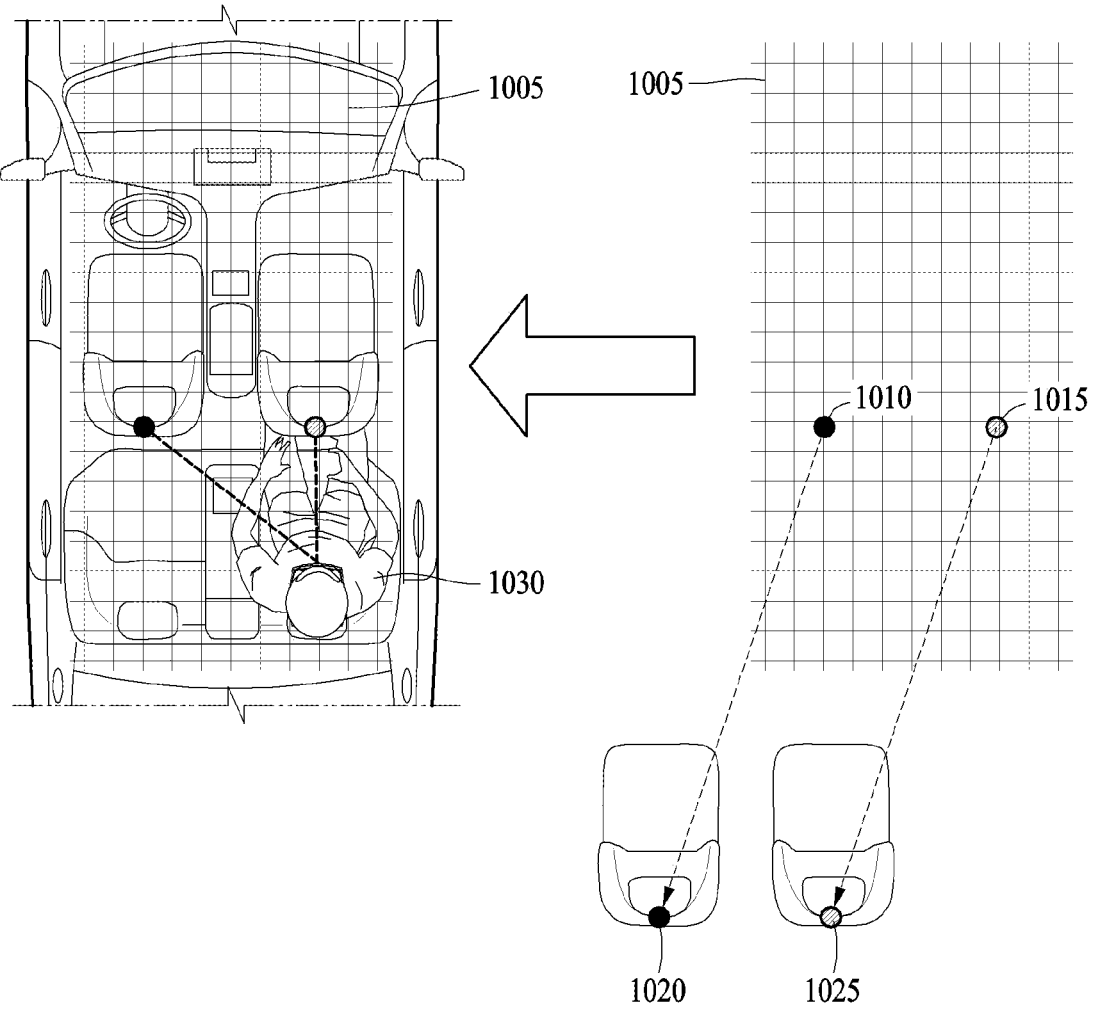
FIG. 10 is a diagram illustrating an example operation of setting a reference point on spatial map data by a wearable AR device using anchor devices according to an example embodiment.
Figure 11:
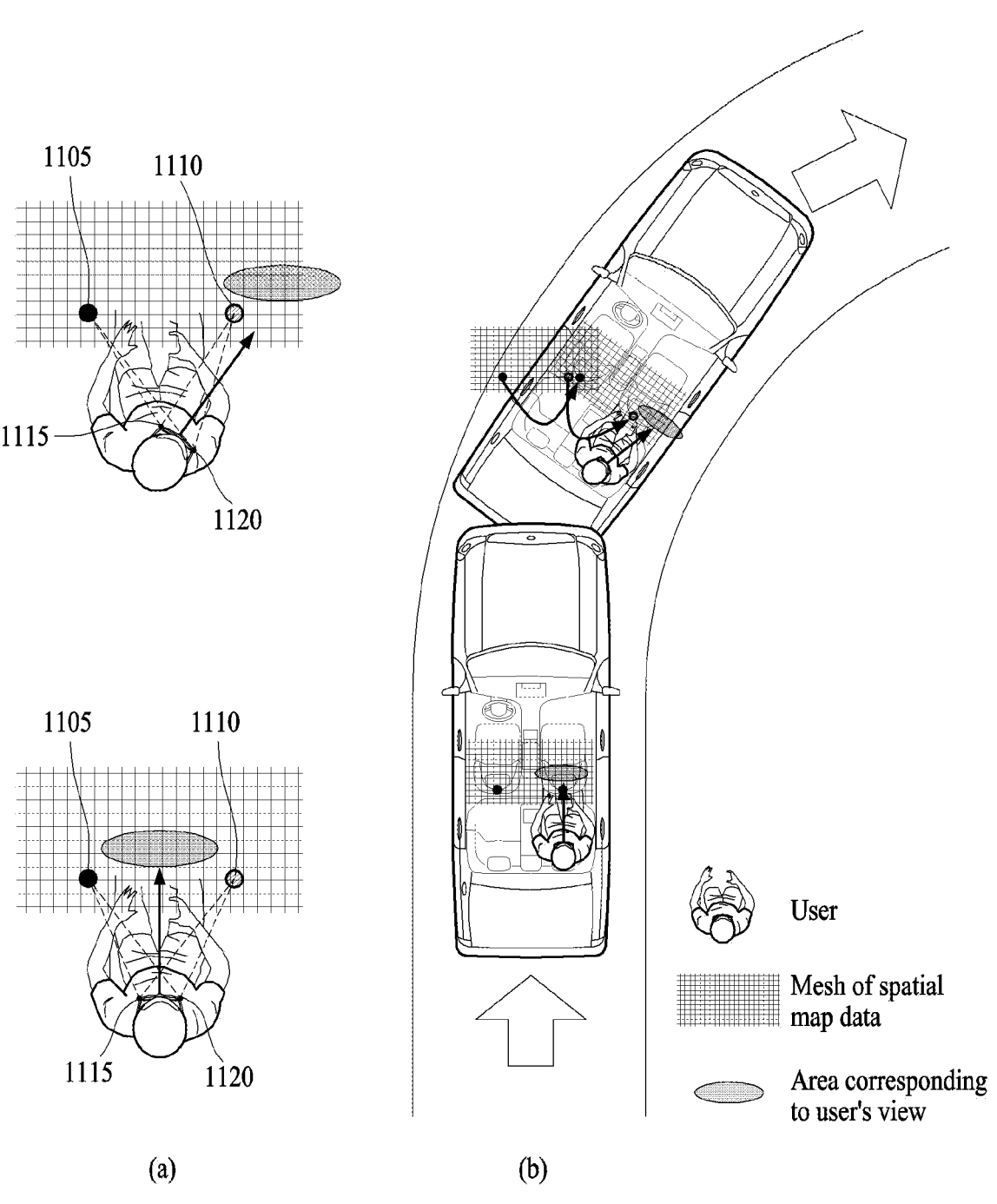
FIG. 11 is a diagram illustrating an example operation of determining at least one of a current position or a current direction of a wearable AR device by the wearable AR device using anchor devices of a vehicle, tag devices of the wearable AR device, and aligned spatial map data according to an example embodiment.

FIG. 10 is a diagram illustrating an example operation of setting a reference point on spatial map data by a wearable AR device using anchor devices according to an embodiment, and FIG. 11 is a diagram illustrating an example operation of determining at least one of a current position or a current direction of a wearable AR device by the wearable AR device using anchor devices of a vehicle, tag devices of the wearable AR device, and aligned spatial map data according to an embodiment.

Referring to FIG. 10, illustrated are first spatial map data 1005 in the form of a mesh corresponding to a space of a vehicle, and reference points 1010 and 1015 corresponding to respective positions of anchor devices 1020 and 1025 of the vehicle on the first spatial map data 1005.

According to an embodiment, a wearable AR device (e.g., the wearable AR device 200 of FIG. 2) may determine an initial positional relationship such as a distance and an angle between the wearable AR device and the anchor devices 1020 and 1025 by communicating with the anchor devices

1020 and 1025, and set the reference points 1010 and 1015 corresponding to the positions of the anchors 1020 and 1025 on the first spatial map data 1005 based on the determined initial positional relationship. For example, as illustrated in FIG. 10, a user 1030 may be seated on a right rear seat, and the wearable AR device may communicate with the anchor devices 1020 and 1025 at a position of the right rear seat to determine the initial positional relationship between the wearable AR device and the anchor devices 1020 and 1025 and set the reference points 1010 and 1015 on the first spatial map data 1005 corresponding to the positions of the anchor devices 1020 and 1025 based on the determined positional relationship.

When there is third spatial map data (not shown) (e.g., third spatial map data 1610 of FIG. 16) previously generated for the space of the vehicle and there are reference points set on the third spatial map data, the wearable AR device may set the reference points on the third spatial map data as the reference points 1010 and 1015 of the first spatial map data 1005.

For example, the reference points 1010 and 1015 of the first spatial map data 1005 may be set by the user 1030. The wearable AR device may request an alignment between the space of the vehicle and the first spatial map data 1005 from the user 1030 through a display of the wearable AR device, and may receive a corresponding user input from the user 1030. For example, the wearable AR device may receive a user input for determining points on the first spatial map data 1005 corresponding to the positions of the anchor devices 1020 and 1025, determine the points based on the user input, and set the points as the reference points 1010 and 1015.

The wearable AR device may determine a current positional relationship between the wearable AR device and the anchor devices 1020 and 1025, and determine at least one of a current position or a current direction of the wearable AR device on the first spatial map data 1005 based on the current positional relationship and the reference points 1010 and 1015.

For example, the wearable AR device may recognize components such as a seat and a backrest of the vehicle in an image acquired through a camera, determine a positional relationship with the components from the image, and determine, as the reference points 1010 and 1015, points on the first spatial map data 1005 corresponding to positions of the components.

Referring to FIG. 11, illustrated is an example operation of determining a current position and a current direction of a wearable AR device on first spatial map data corresponding to a space of a vehicle.

According to an embodiment, a wearable AR device (e.g., the wearable AR device 200 of FIG. 2) may include tag devices 1115 and 1120. The wearable AR device may determine a positional relationship between the tag devices 1115 and 1120 of the wearable AR device and anchor devices 1105 and 1110 of a vehicle.

The anchor devices 1105 and 1110 of the vehicle may be included in the vehicle, or be included in another electronic device (e.g., the electronic device 101 of FIG. 1) fixed in the space of the vehicle.

Referring to (a) of FIG. 11, the wearable AR device may determine at least one of a current position or a current direction of the wearable AR device on first spatial map data based on the positional relationship between the anchor devices 1105 and 1110 of the vehicle and the tag devices 1115 and 1120 of the wearable AR device. The wearable AR device may determine an area on the first spatial map data corresponding to a view of a user based on a current position and a current direction of the user, and output an AR content corresponding to the area.

Referring to (b) of FIG. 11, when the vehicle moves, the wearable AR device may determine the current position and the current direction of the wearable AR device on the first spatial map data based on the positional relationship between the anchor devices 1105 and 1110 of the vehicle and the tag devices 1115 and 1120 of the wearable AR device.

Since the anchor devices 1105 and 1110 of the vehicle move together with the vehicle, the wearable AR device may determine and use the positional relationship between the anchor devices 1105 and 1110 of the vehicle and the tag devices 1115 and 1120 of the wearable AR device even when the vehicle moves, and may accurately determine the current position and the current direction of the wearable AR device on the first spatial map data, thereby providing the user with a stable AR content experience.

When the wearable AR device determines at least one of the current position or the current direction of the wearable AR device on the first spatial map data using the positional relationship between the anchor devices 1105 and 1110 of the vehicle and the tag devices 1115 and 1120 of the wearable AR device, the wearable AR device may ignore IMU values of the wearable AR device and the vehicle or may turn off IMUs of the wearable AR device and the vehicle.

Figure 12:
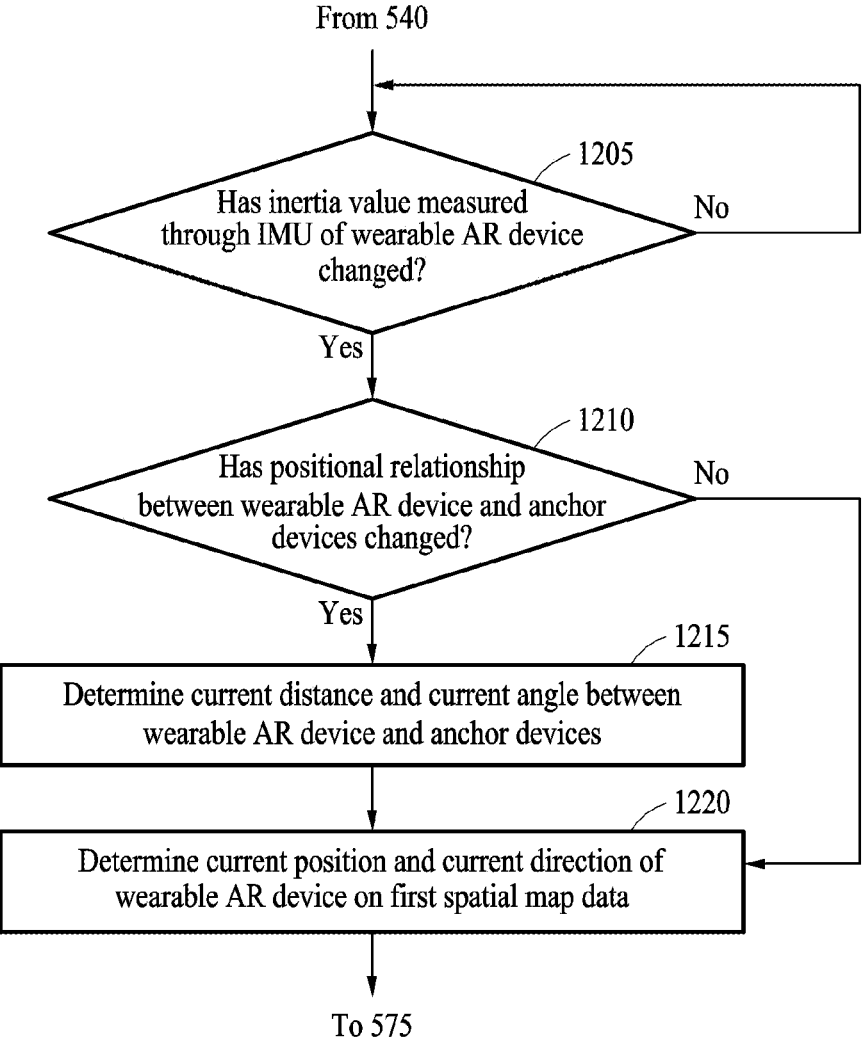
FIG. 12 is a flowchart illustrating an example operation of determining a current position and a current direction of a wearable AR device by the wearable AR device using anchor devices according to an example embodiment.

FIG. 12 is a flowchart illustrating an example operation of determining a current position and a current direction of a wearable AR device by the wearable AR device using anchor devices according to an embodiment.

Referring to FIG. 12, in operation 1205, when reference points on first spatial map data corresponding to positions of anchor devices are set in operation 540 described above with reference to FIG. 5, a wearable AR device (e.g., the wearable AR device 200 of FIG. 2) may determine whether an inertia value measured through an IMU of the wearable AR device has changed. The inertia value of the wearable AR device may change when a vehicle on which a user is board moves or when the user wearing the wearable AR device moves.

When the inertia value of the wearable AR device has not changed, the wearable AR device may repeatedly check whether the inertia value of the wearable AR device changes in operation 1205.

In operation 1210, when the inertia value of the wearable AR device has changed, the wearable AR device may determine whether an initial positional relationship, such as an initial distance and an initial angle between the wearable AR device and the anchor devices, has changed.

In operation 1220, when the initial positional relationship has not changed, the wearable AR device may determine at least one of a current position or a current direction of the wearable AR device on first spatial map data, based on the first spatial map data and/or the initial positional relationship between the wearable AR device and the anchor devices.

In operation 1215, when the initial positional relationship has changed, the wearable AR device may determine a current positional relationship such as a current distance and a current angle between the wearable AR device and the anchor devices.

In operation 1220, the wearable AR device may determine at least one of the current position or the current direction of the wearable AR device on the first spatial map data, based on the current positional relationship between the wearable AR device and the anchor devices and the reference points.

When the current position and the current direction of the wearable AR device are determined in operation 1220, the wearable AR device may output an AR content corresponding to the current position and the current direction of the wearable AR device determined on the first spatial map data, in operation 575.

According to an embodiment, in operation 1220, the wearable AR device may analyze an image acquired through a camera of the wearable AR device to determine at least one of a current position or a current direction of the wearable AR device on the first spatial map data. For example, the wearable AR device may calculate a movement of the head of the user by analyzing a change in relative positions between the wearable AR device and the body of the user in a captured image of an area below an angle of view of the camera. In this example, the wearable AR device may determine at least one of the current position or the current direction of the wearable AR device on the first spatial map data based on the calculated movement of the head.

According to embodiment, in operation 1220, the wearable AR device may recognize components, such as, for example, a seat, a backrest, and a rearview mirror of the vehicle, in an image acquired through the camera and track the components to determine a movement of the user. The wearable AR device may determine at least one of the current position or the current direction of the wearable AR device on the first spatial map data based on the determined movement.

Figure 13:
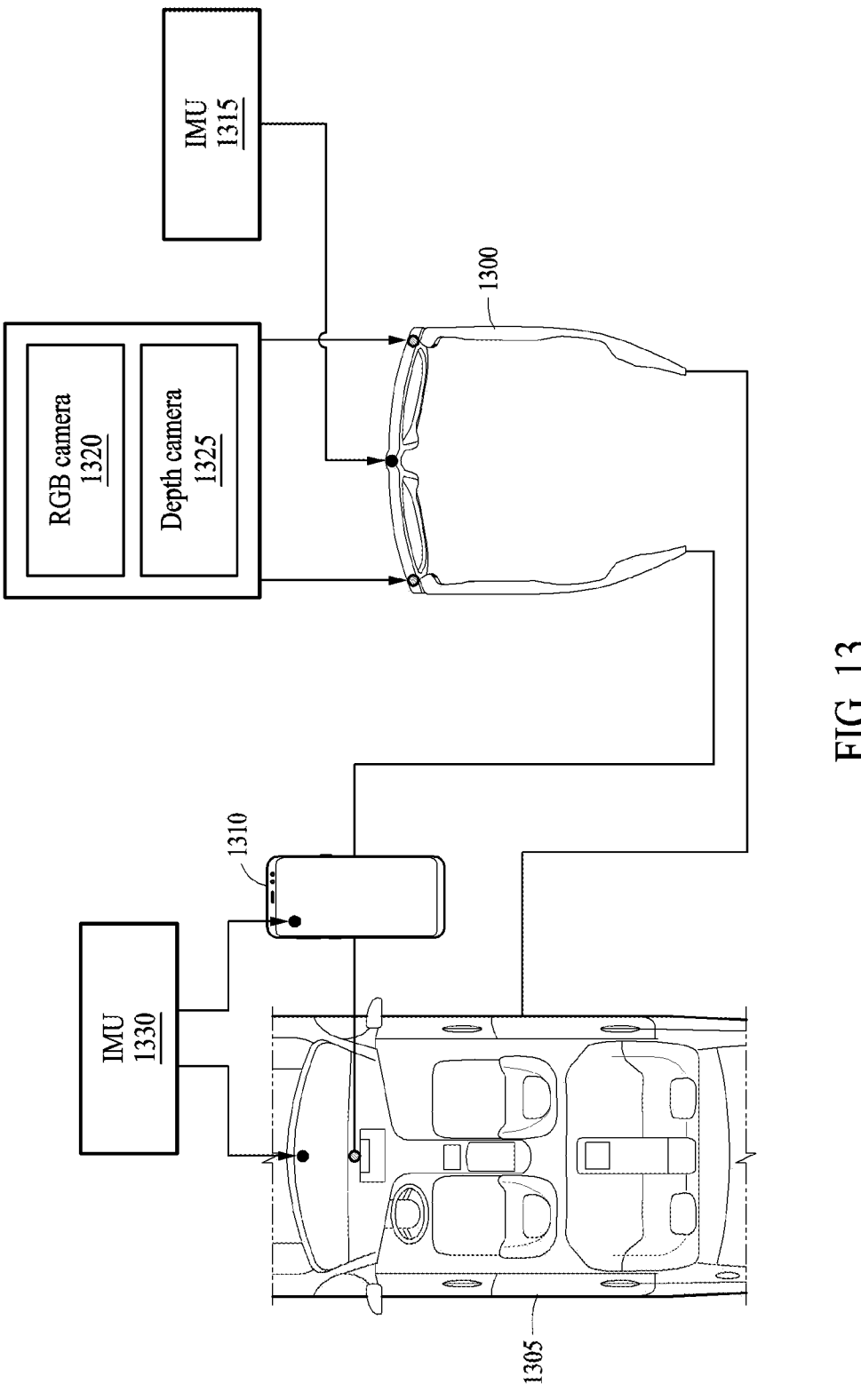
FIG. 13 is a diagram illustrating an example operation of determining a current position and a current direction of a wearable AR device by the wearable AR device using an inertia value of a vehicle according to an example embodiment.
Figure 14:
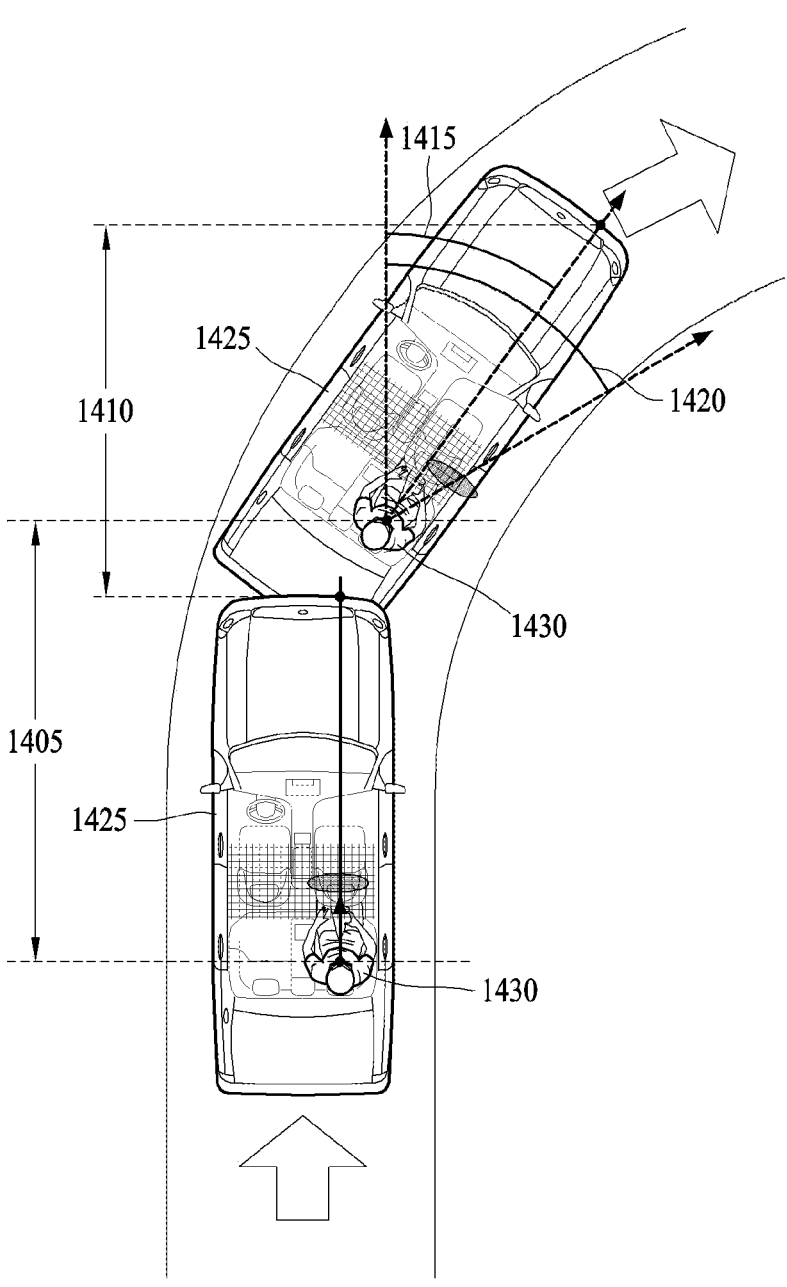
FIG. 14 is a diagram illustrating an example operation of determining a variation in an inertia value by a movement of a user by a wearable AR device based on a difference between an inertia value of the wearable AR device and an inertia value of a vehicle according to an example embodiment.

FIG. 13 is a diagram illustrating an example operation of determining a current position and a current direction of a wearable AR device by the wearable AR device using an inertia value of a vehicle according to an embodiment, and FIG. 14 is a diagram illustrating an example operation of determining a variation in an inertia value by a movement of a user by a wearable AR device based on a difference between a variation in an inertia value of the wearable AR device and a variation in an inertia value of a vehicle according to an embodiment.

Referring to FIG. 13, a wearable AR device 1300 (e.g., the wearable AR device 200 of FIG. 2) including an IMU 1315 may receive an inertia value of a vehicle 1305 from at least one of the vehicle 1305 or an electronic device 1310 present in a space of the vehicle 1305. In an example embodiment, an IMU 1330 may refer to an IMU included in any one of the electronic device 1310 and the vehicle 1305. In an embodiment, the electronic device 1310 may be fixed in the space of the vehicle 1305, and an inertia value measured through the IMU 1330 of the electronic device 1310 may be an inertia value of the vehicle 1305.

According to an embodiment, the wearable AR device 1300 (e.g., the wearable AR device 200 of FIG. 2) may be connected to at least one of the vehicle 1305 or the electronic device 1310 (e.g., the electronic device 101 of FIG. 1). For example, the wearable AR device 1300 may be connected to at least one of the vehicle 1305 or the electronic device 1310 wirelessly or by wire. The wearable AR device 1300 may be connected, directly or indirectly, to at least one of the vehicle 1305 or the electronic device 1310 through at least one of WiFi, Bluetooth, or wired connection, for example. However, this is provided merely as an example, and the wearable AR device 1300 may be connected to at least one of the vehicle 1305 or the electronic device 1310 in various ways.

The wearable AR device 1300 may receive an inertia value of the vehicle 1305 from at least one of the vehicle 1305 or the electronic device 1310 present in the space of the vehicle 1305 and correct an inertia value measured through the IMU 1315 of the wearable AR device 1300 based on the inertia value of the vehicle 1305.

Referring to FIG. 14, illustrated is an example of correcting an inertia value measured through the IMU 1315 of the wearable AR device 1300 based on an inertia value of a vehicle 1425 (e.g., the vehicle 1305 of FIG. 13).

The inertia value measured through the IMU 1315 of the wearable AR device 1300 may reflect therein both an inertia value by a movement of the vehicle 1425 and an inertia value by a movement of a user 1430. The wearable AR device 1300 may calculate a difference between a variation in the inertia value of the wearable AR device 1300 and a variation in the inertia value of the vehicle 1425, and determine a variation in the inertia value by the movement of the user 1430 based on the calculated difference.

For example, as illustrated in FIG. 14, the user 1430 on board the vehicle 1425 may turn their head to the right while the vehicle 1425 is turning right.

The wearable AR device 1300 may determine the variation in the inertia value by the movement of the user 1430 based on the difference between the variation in the inertia value of the vehicle 1425 and the variation in the inertia value of the wearable AR device 1300, and correct the inertia value measured through the IMU 1315 of the wearable AR device 1300 based on the determined variation in the inertia value.

For example, the wearable AR device 1300 may determine a first acceleration variation 1405 and a first angular velocity variation 1420 based on a movement of the vehicle 1425 and a movement of the user 1430, through the IMU 1315. The wearable AR device 1300 may receive an inertia value of the vehicle 1425 from at least one of the vehicle 1425 or the electronic device 1310 present in the vehicle 1425 and determine a second acceleration variation 1410 and a second angular velocity variation 1415 by a movement of the vehicle 1425.

The wearable AR device 1300 may determine an acceleration variation and an angular velocity variation by a movement of the user 1430 based on a difference between the first acceleration variation 1405 and the second acceleration variation 1410 and a difference between the first angular velocity variation 1420 and the second angular velocity variation 1415. The wearable AR device 1300 may correct an acceleration and an angular velocity measured through the IMU 1315 of the wearable AR device 1300 based on the determined acceleration variation and the determined angular velocity variation by the movement of the user 1430.

The correction of the acceleration and the angular velocity described above with reference to FIG. 14 is provided merely as an example, and other types of values may be used when other IMUs are used in the wearable AR device 1300. Each IMU may comprise at least measurement circuitry. For example, the IMUs 1315 and 1330 of the wearable AR device 1300 and the vehicle 1425 and the electronic device 1310 may further output a geomagnetic bearing value, and the wearable AR device 1300 may correct the geomagnetic bearing value of the wearable AR device 1300 using a difference between a geomagnetic bearing variation received from at least one of the vehicle 1425 or the electronic device 1310 and a geomagnetic bearing variation of the wearable AR device 1300.

The wearable AR device 1300 may determine an initial position of the wearable AR device 1300 and an initial direction the wearable AR device 1300 faces, on the first spatial map data, based on an image acquired through a camera of the wearable AR device 1300 and the corrected inertia value. For example, the wearable AR device 1300 may determine the initial position and the initial direction of the wearable AR device 1300 on the first spatial map data based on images acquired through an RGB camera 1320 and a depth camera 1325 of the wearable AR device 1300 and on the corrected inertia value.

The wearable AR device 1300 may determine at least one of a current position or a current direction of the wearable AR device 1300 on the first spatial map data, based on the initial position and the initial direction of the wearable AR device 1300 on the first spatial map data, the inertia value of the vehicle 1425, and the inertia value of the wearable AR device 1300. This will be further described below with reference to FIG. 15.

FIG. 15 is a flowchart illustrating an example operation of determining a current position and a current direction of a wearable AR device by the wearable AR device using an inertia value of a vehicle according to an embodiment.

Referring to FIG. 15, in operation 1505, a wearable AR device (e.g., the wearable AR device 200 of FIG. 2) may determine whether an inertia value measured through an IMU of the wearable AR device has changed.

When the inertia value of the wearable AR device has not changed, the wearable AR device may repeatedly and/or periodically check whether the inertia value of the wearable AR device changes in operation 1505.

In operation 1510, when the inertia value of the wearable AR device has changed, the wearable AR device may determine whether a difference between a variation in an inertia value of a vehicle and a variation in the inertia value of the wearable AR device is greater than or equal to a threshold value. In a case in which a user wearing the wearable AR device moves in the vehicle, the variation in the inertia value of the vehicle and the variation in the inertia value of the wearable AR device may be different from each other.

When the difference between the variation in the inertia value of the vehicle and the variation in the inertia value of the wearable AR device is less than the threshold value in operation 1505, the wearable AR device may check again whether the inertia value of the wearable AR device has changed.

In operation 1515, when the difference between the variation in the inertia value of the vehicle and the variation in the inertia value of the wearable AR device is greater than or equal to the threshold value, the wearable AR device may determine a variation in an inertia value by a movement of the user, based on the difference between the variation in the inertia value of the vehicle and the variation in the inertia value of the wearable AR device.

In operation 1520, the wearable AR device may determine at least one of a current position or a current direction of the wearable AR device on first spatial map data, based on the variation in the inertia value by the movement of the user.

For example, the wearable AR device may determine a first variation in position and direction of the wearable AR device based on the variation in the inertia value by the movement of the user and apply the determined first variation to an initial position and an initial direction of the wearable AR device on the first spatial map data to determine the current position and the current direction of the wearable AR device on the first spatial map data.

Figure 16:
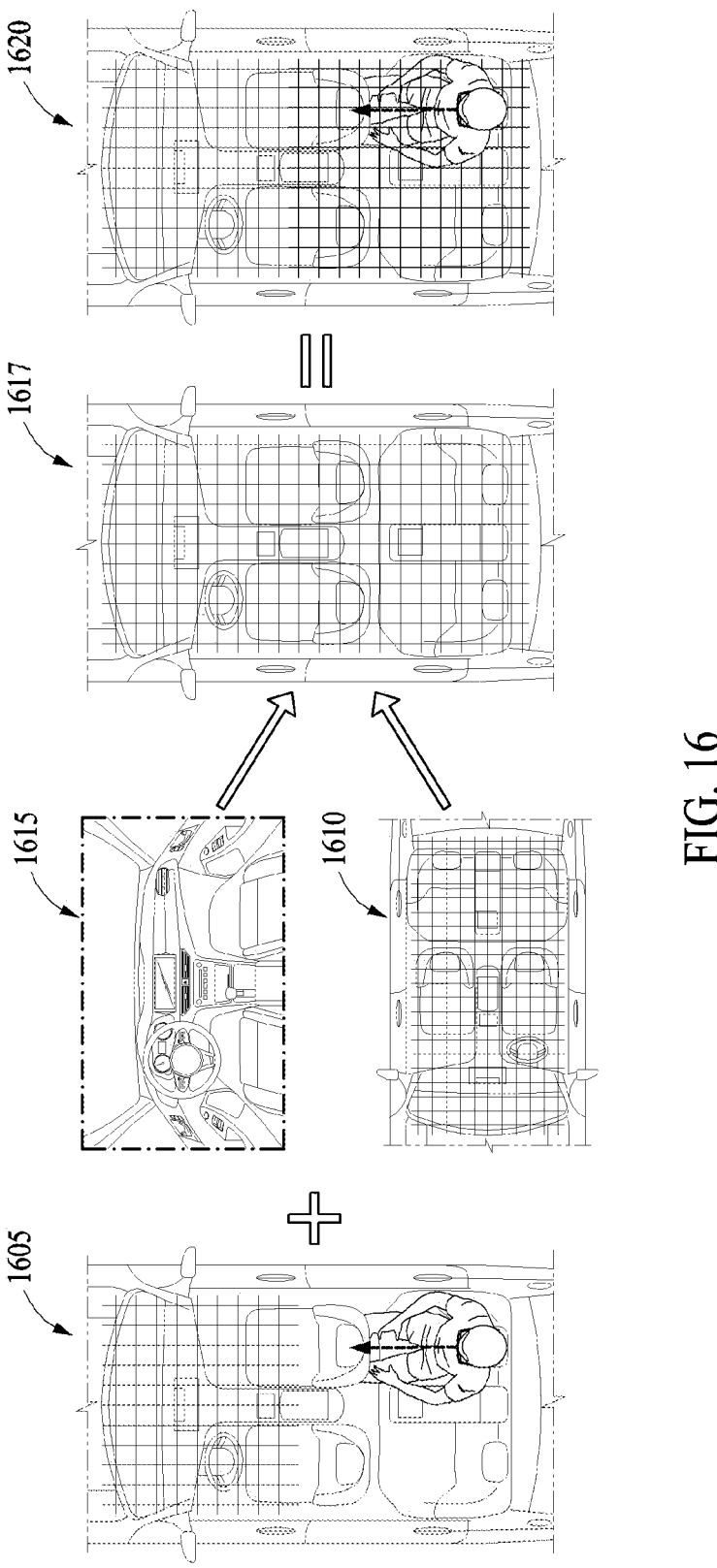
FIG. 16 is a diagram illustrating example spatial map data corresponding to a space of a vehicle according to an example embodiment.

FIG. 16 is a diagram illustrating example spatial map data corresponding to a space of a vehicle according to an embodiment.

When a user moves inside a vehicle, a new space that was not visible when an initial spatial map was generated may begin to be visible, and a wearable AR device (e.g., the wearable AR device 200 in FIG. 2) may update spatial map data each time a new space is visible, consuming great computing resources. To prevent or reduce such frequent updates of spatial map data, the wearable AR device may use previously generated spatial map data and spatial information about a space of the vehicle. For example, the spatial information may include information about dimensions of the space of the vehicle and components such as a seat included in the space.

According to an embodiment, the wearable AR device may generate first spatial map data 1620 corresponding to the space of the vehicle, using at least one of second spatial map data 1605 corresponding to a space of the vehicle around the wearable AR device within the space of the vehicle, third spatial map data 1610 previously generated for the space of the vehicle, or fourth spatial map data 1615 transformed from the spatial information.

Referring to FIG. 16, illustrated is an example of generating the first spatial map data 1620 based on the second spatial map data 1605, the third spatial map data 1610, and the fourth spatial map data 1615.

The wearable AR device may generate the second spatial map data 1605 which is spatial map data corresponding to the space of the vehicle around the wearable AR device within the space of the vehicle. For example, the wearable AR device may generate the second spatial map data 1605 using a camera of the wearable AR device.

When there is the third spatial map data 1610 previously generated for the space of the vehicle, the wearable AR device may retrieve the third spatial map data 1610 and use it to generate the first spatial map data 1620 corresponding to the space of the vehicle. For example, the third spatial map data 1610 may be stored in at least one of the wearable AR device or the vehicle.

When there is the spatial information about the space of the vehicle, the wearable AR device may transform the spatial information into the fourth spatial map data 1615. For example, the spatial information may be stored in at least one of the wearable AR device or the vehicle, or may be received from an external device.

The wearable AR device may generate the first spatial map data 1620 by combining at least one of the second spatial map data 1605, the third spatial map data 1610, or the fourth spatial map data 1615. For example, the wearable AR device may generate the first spatial map data 1620 by combining the third spatial map data 1610 and the fourth spatial map data 1615 and overwriting, with the second spatial map data 1605, spatial map data 1617 generated by the combining.

By generating the first spatial map data 1620, the wearable AR device may secure a spatial map of the entire space of the vehicle immediately after the user gets on the vehicle, and may reduce the number of cases in which a current position and a current direction of the wearable AR device deviate from the first spatial map data 1620 and may thereby reduce the number of updates of the first spatial map data 1620.

Figure 17:
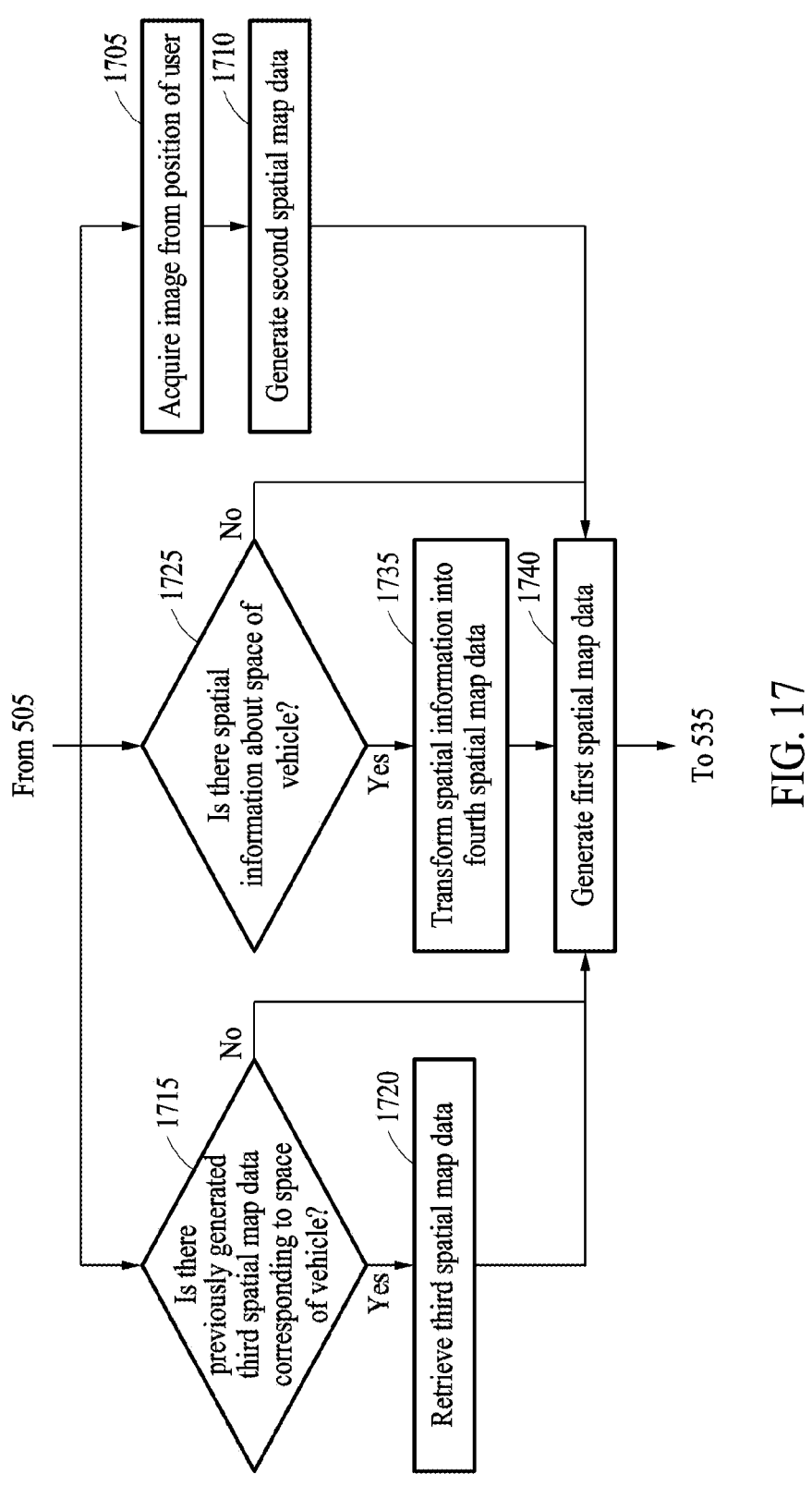
FIG. 17 is a flowchart illustrating an example operation of generating spatial map data corresponding to a space of a vehicle by a wearable AR device according to an example embodiment.

FIG. 17 is a flowchart illustrating an example operation of generating spatial map data corresponding to a space of a vehicle by a wearable AR device according to an embodiment.

In operation 1705, when it is determined in operation 505 that a wearable AR device (e.g., the wearable AR device 200 of FIG. 2) is in a space of a vehicle, the wearable AR device may acquire an image through a camera of the wearable AR device at a position of the wearable AR device inside the vehicle.

In operation 1710, the wearable AR device may generate second spatial map data corresponding to a space of the vehicle around the wearable AR device within a space of the vehicle based on the acquired image. Since the wearable AR device senses a surrounding space of the wearable AR device at the position of the wearable AR device, spatial map data of a space hidden by an object such as a seat of the vehicle may not be generated.

In operation 1715, the wearable AR device may determine whether there is third spatial map data previously generated for the space of the vehicle. In operation 1720, when there is the third spatial map data previously generated for the space of the vehicle, the wearable AR device may retrieve the third spatial map data (e.g., the third spatial map data 1610 of FIG. 16). The third spatial map data may be used to generate first spatial map data corresponding to the space of the vehicle.

In operation 1725, the wearable AR device may determine whether there is spatial information about the space of the vehicle. For example, the spatial information may include information about dimensions of the space of the vehicle and components such as seats included in the space.

The wearable AR device may determine that there is the spatial information when it is stored in at least one of the vehicle or the wearable AR device or when it is received from an external device.

In operation 1735, the wearable AR device may transform the spatial information into fourth spatial map data.

In operation 1740, the wearable AR device may generate the first spatial map data based on at least one of the second spatial map data, the third spatial map data, or the fourth spatial map data. For example, when it is determined in operation 1715 that there is no third spatial map data previously generated for the space of the vehicle and when it is determined in operation 1725 that there is no spatial information, the wearable The AR device may determine the second spatial map data as the first spatial map data in operation 1740.

For example, when it is determined in operation 1715 that there is the third spatial map data previously generated for the space of the vehicle and when it is determined in operation 1725 that there is no spatial information, the wearable AR device may generate the first spatial map data corresponding to the space of the vehicle, based on the second spatial map data and the third spatial map data. For example, the wearable AR device may generate the first spatial map data by overwriting the third spatial map data with the second spatial map data.

For example, when it is determined in operation 1715 that there is no third spatial map data previously generated for the space of the vehicle and when it is determined in operation 1725 that there is spatial information, the wearable AR device may generate the first spatial map data corresponding to the space of the vehicle, based on the second spatial map data and the fourth spatial map data. For example, the wearable AR device may generate the first spatial map data by overwriting the fourth spatial map data with the second spatial map data.

For example, when it is determined in operation 1715 that there is the third spatial map data previously generated for the space of the vehicle and when it is determined in operation 1725 that there is spatial information, the wearable AR device may generate the first spatial map data based on the second spatial map data, the third spatial map data, and the fourth spatial map data. In this example, the wearable AR device may generate the first spatial map data by combining the third spatial map data and the fourth spatial map data and overwriting the combined spatial map data with the second spatial map data.

By generating the first spatial map data as described above, the wearable AR device may secure a spatial map of the entire space of the vehicle immediately after the user gets on the vehicle, and may reduce the number of cases in which a current position and a current direction of the wearable AR device deviate the first spatial map data and reduce the number of updates of the first spatial map data.

Figure 18:
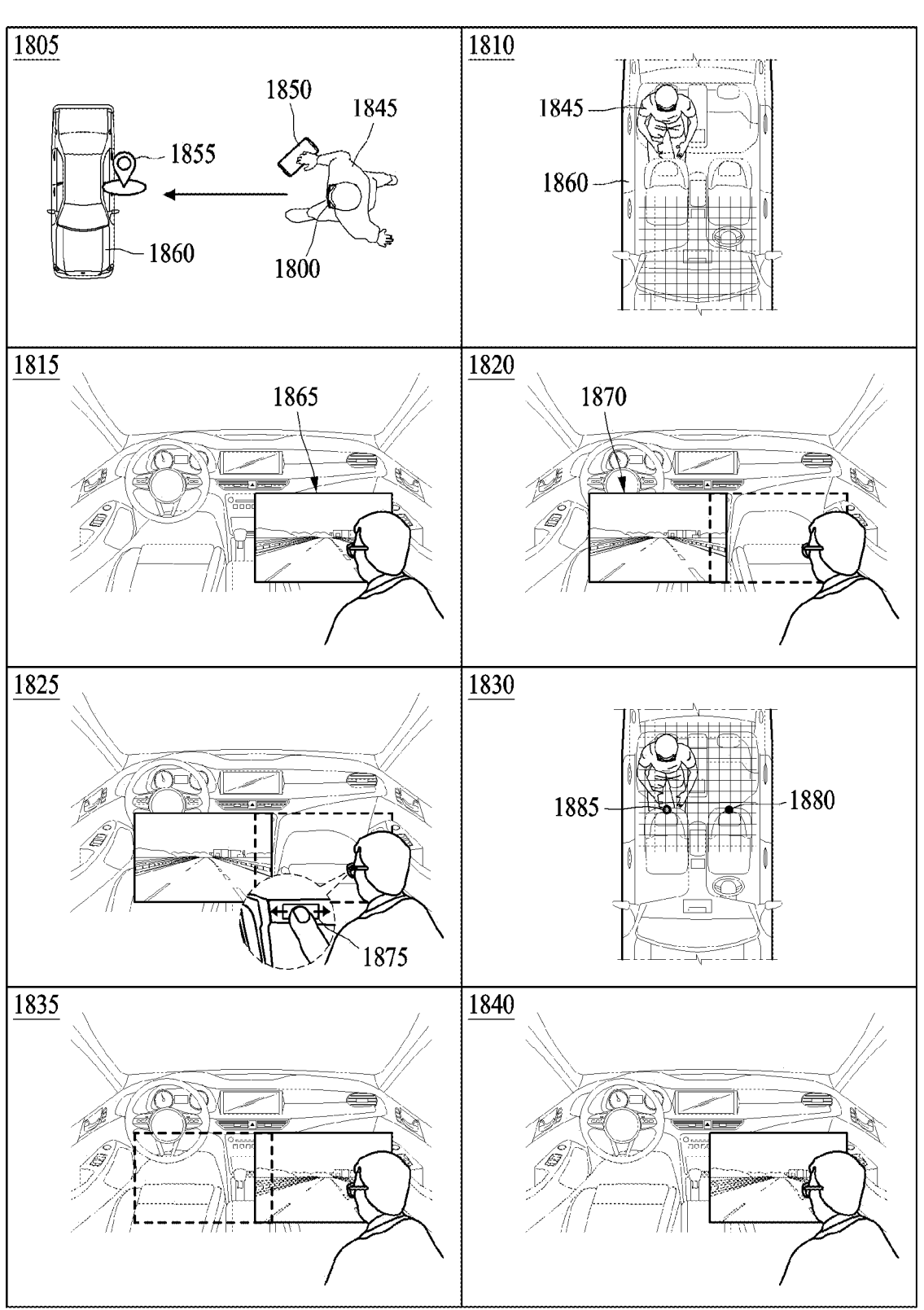
FIG. 18 is a diagram illustrating an example of outputting an AR content by a wearable AR device based on a user command according to an example embodiment.

FIG. 18 is a diagram illustrating an example of outputting an AR content by a wearable AR device based on a user command according to an embodiment.

In a situation 1805, a user 1845 who wears a wearable AR device 1800 (e.g., the wearable AR device 200 of FIG. 2) and carries with them an electronic device 1850 (e.g., the electronic device of FIG. 1) connected to the wearable AR device 1800 may view an AR content 1855 indicating a vehicle 1860 output on a display of the wearable AR device 1800 and move to get on the vehicle 1860. Since the user 1845 is in an outdoor space that is a fixed space in the situation 1805, the wearable AR device 1800 may determine a current direction of the user 1845 based on a value measured using at least one sensor of the wearable AR device 1800 and output the AR content 1855 corresponding to the current direction of the user 1845.

In a situation 1810, when the user 1845 gets on the vehicle 1860, the wearable AR device 1800 may generate second spatial map data corresponding to a space of the vehicle 1860 around the wearable AR device 1800 within a space of the vehicle 1860.

When the user 1845 gets on the vehicle 1860, the wearable AR device 1800 may communicate with the vehicle 1860. Thus, even before receiving a user command, the wearable AR device 1800 may generate the second spatial map data and then generate first spatial map data corresponding to the space of the vehicle 1860 based on the second spatial map data, third spatial map data previously generated for the space of the vehicle 1860, and fourth spatial map data transformed from spatial information about the space of the vehicle 1860.

In a situation 1815, the user 1845 may use an AR content 1865 through the wearable AR device 1800 inside the vehicle 1860. In a situation 1820, the vehicle 1860 may move. The wearable AR device 1800 may recognize that the user 1845 moves based on an inertia value of the wearable AR device 1800 that changes as the vehicle 1860 moves, and may output a moved AR content 1870.

In a situation 1825, the user 1845 may input a user command by touching a specific area 1875 of the wearable AR device 1800 (e.g., a glasses frame of the wearable AR device 1800 provided in the form of eyeglasses). When receiving such a touch input from the user 1845, the wearable AR device 1800 may determine that the wearable AR device 1800 is in the space of the vehicle 1860.

For another example, the user 1845 may input a user command through the electronic device 1850. The wearable AR device 1800 may receive a touch input from the user 1845 through the electronic device 1850 and determine that the wearable AR device 1800 is in the space of the vehicle 1860.

In a situation 1830, the wearable AR device 1800 may detect anchor devices 1880 and 1885 in the vehicle 1860, and communicate with the detected anchor devices 1880 and 1885 to set reference points on the first spatial map data. For a detailed description of setting the reference points, reference may be made to what has been described above with reference to FIG. 10.

In a situation 1835, the wearable AR device 1800 may determine at least one of a current position or a current direction of the wearable AR device 1800 on the first spatial map data based on a current positional relationship between the anchor devices 1880 and 1885 and the wearable AR device 1800, and may output an AR content corresponding to the determined current position and the determined current direction of the wearable AR device.

In a situation 1840, the wearable AR device 1800 may provide an AR content by reflecting only a movement of the user 1845, irrespective of a movement of the vehicle 1860, and the user 1845 may thus use the AR content stably.

Figure 19:
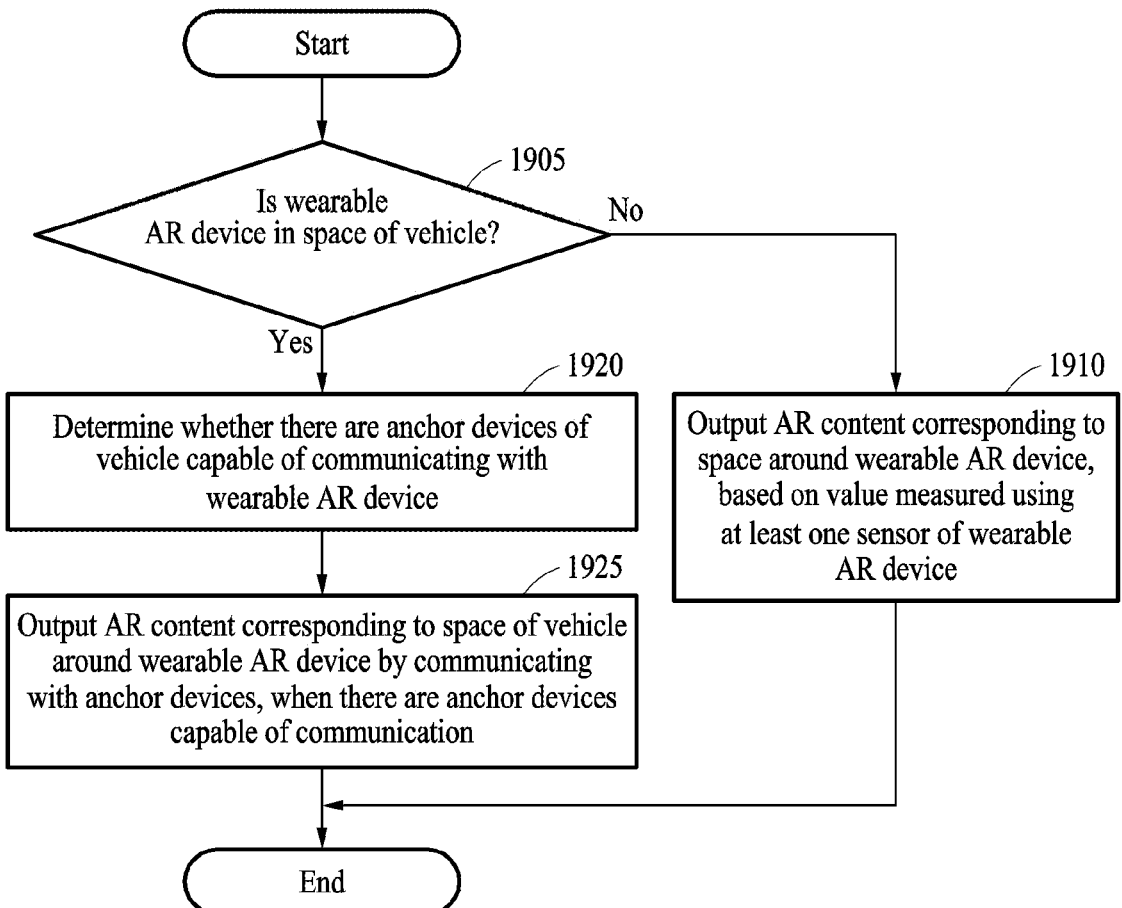
FIG. 19 is a flowchart illustrating an example AR content providing method according to an example embodiment.

FIG. 19 is a flowchart illustrating an example AR content providing method according to an embodiment.

According to an embodiment, an AR content providing method may include operation 1905 of determining whether a wearable AR device (e.g., the wearable AR device 200 of FIG. 2) is in a space of a vehicle based on at least one of information received from the vehicle or a value measured using at least one sensor of the wearable AR device; operation 1910 of outputting an AR content corresponding to a space around the wearable AR device based on the value measured using the at least one sensor of the wearable AR device, when it is determined that the wearable AR device is not in the space of the vehicle; operation 1920 of determining whether there are anchor devices capable of communicating with the wearable AR device when it is determined that the wearable AR device is in the space of the vehicle; and operation 1925 of outputting an AR content corresponding to a space of the vehicle around the wearable AR device by communicating with the anchor devices, when it is determined that there are the anchor devices capable of communication.

The outputting of the AR content may include determining a current position of the wearable AR device and a current direction the wearable AR device faces on first spatial map data corresponding to the space of the vehicle by communicating with the anchor devices; and outputting an AR content corresponding to the current position and the current direction.

The determining of the current direction may include generating second spatial map data corresponding to the space of the vehicle around the wearable AR device at a position of the wearable AR device within the vehicle; when there is third spatial map data previously generated for the space of the vehicle, retrieving the third spatial map data; when there is spatial information about the space of the vehicle, transforming the spatial information into fourth spatial map data; and generating the first spatial map data based on at least one of the second spatial map data, the third spatial map data, or the fourth spatial map data.

The determining of the current direction may include setting reference points corresponding to positions of the anchor devices on the first spatial map data; determining the current position and the current direction on the first spatial map data based on a current distance and a current angle between the wearable AR device and the anchor devices and on the reference points.

The setting of the reference points may include: while the vehicle is in a stationary state, determining an initial distance and an initial angle between the wearable AR device and the anchor devices by communicating with the anchor devices; determining points corresponding to the positions of the anchor devices on the first spatial map data based on the value measured using the at least one sensor of the wearable AR device, and the initial distance and the initial angle; and setting the determined points as the reference points.

According to an embodiment, a wearable AR device (e.g., the wearable AR device 200 of FIG. 2) may include a processor (e.g., the processor (not shown) of FIG. 2) and a memory (e.g., the memory (not shown) of FIG. 2) storing therein instructions to be executed by the processor. When the instructions are executed by the processor, the processor may determine whether the wearable AR device is in a space of a vehicle based on at least one of information received from the vehicle or a value measured using at least one sensor of the wearable AR device; when it is determined that the wearable AR device is not in the space of the vehicle, output an AR content corresponding to a space around the wearable AR device based on the value measured using the at least one sensor of the wearable AR device; when it is determined that the wearable AR device is in the space of the vehicle, determine whether there are anchor devices of the vehicle capable of communicating with the wearable AR device; and when it is determined that there are the anchor devices capable of communication, output an AR content corresponding to a space of the vehicle around the wearable AR device by communicating with the anchor devices. Each "processor" herein comprises processing circuitry.

When it is determined that the wearable AR device is in the space of the vehicle, the processor may determine a current position of the wearable AR device and a current direction the wearable AR device faces on first spatial map data corresponding to the space of the vehicle, by communicating with the anchor devices; and output an AR content corresponding to the current position and the current direction.

When it is determined that the wearable AR device is in the space of the vehicle, the processor may generate second spatial map data corresponding to the space of the vehicle around the wearable AR device at a position of the wearable AR device within the vehicle; when there is third spatial map data previously generated for the space of the vehicle, retrieve the third spatial map data; when there is spatial information about the space of the vehicle, transform the spatial information into fourth spatial map data; and generate the first spatial map data based on at least one of the second spatial map data, the third spatial map data, or the fourth spatial map data.

The processor may set reference points corresponding to the positions of the anchor devices on the first spatial map data; and determine the current position and the current direction on the first spatial map data, based on a current distance and a current angle between the wearable AR device and the anchor devices and on the reference points.

The processor may determine an initial distance and an initial angle between the wearable AR device and the anchor devices by communicating with the anchor devices while the vehicle is in a stationary state; determine points corresponding to the positions of the anchor devices on the first spatial map data based on the value measured using the at least one sensor of the wearable AR device and the initial distance and the initial angle; and set the determined points as the reference points.

The processor may receive a user input for determining points on the first spatial map data corresponding to the positions of the anchor devices; determine the points based on the user input; and set the determined points as the reference points.

The processor may determine whether an inertia value measured through an IMU of the wearable AR device has changed; when it is determined that the inertia value has changed, determine whether the initial distance and the initial angle between the wearable AR device and the anchor devices have changed; when it is determined that the initial distance and the initial angle have changed, determine a current distance and a current angle between the wearable AR device and the anchor devices; and determine the current position and the current direction on the first spatial map data based on the current distance and the current angle and on the determined reference points.

The processor may determine a variation in an image acquired through a camera of the wearable AR device; determine a variation in an inertia value measured through the IMU of the wearable AR device; determine whether the variation in the image and the variation in the inertia value correspond to each other; and when the variation in the image and the variation in the inertia value do not correspond to each other, determine that the wearable AR device is in the space of the vehicle.

The processor may determine an inertia value measured through the IMU (the IMU comprising measurement circuitry) of the wearable AR device for a set time; determine whether the inertia value acquired for the set time is maintained within a set range; and when the inertia value acquired for the set time is maintained within the set range, determine that the wearable AR device is in the space of the vehicle.

The processor may determine a distance between the vehicle and the wearable AR device by communicating with the anchor devices of the vehicle; when the distance is less than or equal to a set distance, receive, from the vehicle, information acquired through at least one of a vehicle door open detection sensor, a seat weight sensor, a DMS, or an OMS of the vehicle; determine whether a boarding condition is met based on the received information; and when the boarding condition is met, determine that the wearable AR device is in the space of the vehicle.

When it is determined there are no anchor devices capable of communication, the processor may determine whether it is possible to receive an inertia value of the vehicle from at least one of the vehicle or an electronic device (e.g., the electronic device 101) present in the space of the vehicle; when it is determined to be possible to receive the inertia value of the vehicle, correct an inertia value measured through the IMU of the wearable AR device based on the inertia value of the vehicle; determine an initial position of the wearable AR device and an initial direction the wearable AR device faces on the first spatial map data, based on an image acquired through the camera of the wearable AR device and the corrected inertia value; and determine the current position and the current direction on the first spatial map data based on the initial position, the initial direction, the inertia value of the vehicle, and the inertia value of the wearable AR device. "Based on" as used herein covers based at least on.

The processor may determine whether the inertia value of the wearable AR device has changed; when it is determined that the inertia value of the wearable AR device has changed, determine whether a difference between a variation in the inertia value of the vehicle and a variation in the inertia value of the wearable AR device is greater than or equal to a threshold value; when the difference between the variation in the inertia value of the vehicle and the variation in the inertia value of the wearable AR device is greater than or equal to the threshold value, determine a variation in an inertia value by a movement of the wearable AR device based on the difference between the variation in the inertia value of the vehicle and the variation in the inertia value of the wearable AR device; and determine the current position and the current direction on the first spatial map data based on the variation in the inertia value by the movement of the wearable AR device.

The processor may determine a first variation in position and direction of the wearable AR device based on the variation in the inertia value by the movement of the wearable AR device; and apply the first variation to the initial position and the initial direction on the first spatial map data to determine the current position and the current direction of the wearable AR device on the first spatial map data.

When there are no anchor devices capable of communication, the processor may determine the initial position of the wearable AR device and the initial direction the wearable AR device faces on the first spatial map data, based on an image acquired through the camera of the wearable AR device; determine a second variation in position and direction of the wearable AR device using the acquired image; and apply the second variation to the initial position and the initial direction on the first spatial map data to determine the current position and the current direction on the first spatial map data.

The processor of the wearable AR device may perform the operations described above with reference to FIG. 5.

According to various embodiments described herein, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the examples described above.

It should be appreciated that various example embodiments and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Various embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable augmented reality (AR) device, the wearable AR device comprising:

at least one processor including processing circuitry; and memory storing instructions that, when executed by the at least one processor individually or collectively, cause the wearable AR device to:

set reference points corresponding to positions of anchor devices on first spatial map data corresponding to a space of a vehicle;

determine a position and a direction of the wearable AR device on the first spatial map data based on the reference points and a positional relationship between the wearable AR device and anchor devices; and control output of AR content based on the determined position and the determined direction of the wearable AR device.

2. The wearable AR device of claim 1, wherein the instructions, when executed by the at least one processor, cause the wearable AR device to:

determine whether the wearable AR device is in the space of a vehicle based on at least one of information received from the vehicle or a value measured using at least one sensor of the wearable AR device; and determine whether anchor devices of the vehicle are capable of communicating with the wearable AR device.

3. The wearable AR device of claim 2, wherein, based on the vehicle being in a stationary state, the instructions, when executed by the at least one processor, cause the wearable AR device to:

determine an initial distance and an initial angle between the wearable AR device and the anchor devices via communication with the anchor devices;

determine points corresponding to positions of the anchor devices on the first spatial map data based on the measured value using the at least one sensor of the wearable AR device, the initial distance, and the initial angle; and set the determined points as the reference points.

4. The wearable AR device of claim 3, wherein the instructions, when executed by the at least one processor, cause the wearable AR device to:

determine whether an inertia value of the wearable AR device, measured through an inertial measurement unit (IMU) comprising measurement circuitry, has changed;

when the inertia value is determined to have changed, determine whether the initial distance and the initial angle between the wearable AR device and the anchor devices have changed;

when the initial distance and the initial angle are determined to have changed, determine the current distance and the current angle between the wearable AR device and the anchor devices; and determine the current position and the current direction on the first spatial map data based on the current distance, the current angle, and the determined reference points.

5. The wearable AR device of claim 2, wherein the instructions, when executed by the at least one processor, cause the wearable AR device to:

determine a variation in an image acquired through a camera of the wearable AR device;

determine a variation in an inertia value measured through an inertial measurement unit (IMU) of the wearable AR device, the IMU comprising measurement circuitry;

determine whether the variation in the image and the variation in the inertia value correspond to each other; and based on the variation in the image and the variation in the inertia value not corresponding to each other, determine that the wearable AR device is in the space of the vehicle.

6. The wearable AR device of claim 2, wherein the instructions, when executed by the at least one processor, cause the wearable AR device to:

acquire an inertia value measured through an inertial measurement unit (IMU) of the wearable AR device for a set time, the IMU comprising measurement circuitry, determine whether the inertia value acquired for the set time is maintained within a set range; and based on a determination that the inertia value acquired for the set time is maintained within the set range, determine that the wearable AR device is in the space of the vehicle.

7. The wearable AR device of claim 2, wherein the instructions, when executed by the at least one processor, cause the wearable AR device to:

determine a distance between the vehicle and the wearable AR device via communication with anchor devices of the vehicle;

based on a determination that the distance is less than or equal to a set distance, receive, from the vehicle, information acquired through at least one of: a vehicle door open detection sensor, a seat weight sensor, a driver monitoring system, or an occupant monitoring system of the vehicle;

determine whether a boarding condition is met based on the received information; and based on a determination that the boarding condition is met, determine that the wearable AR device is in the space of the vehicle.

8. The wearable AR device of claim 1, wherein the instructions, when executed by the at least one processor, cause the wearable AR device to:

determine a current position of the wearable AR device and a current direction the wearable AR device faces on the first spatial map data, via communication with the anchor devices, and control output of AR content corresponding to the current position and the current direction.

9. The wearable AR device of claim 8, wherein the instructions, when executed by the at least one processor, cause the wearable AR device to:

based on no anchor devices of the vehicle capable of communicating with the wearable AR device, determine whether it is possible to receive an inertia value of the vehicle from at least one of the vehicle or an electronic device present in the space of the vehicle;

based on a determination that it is possible to receive the inertia value of the vehicle, correct an inertia value measured through an inertial measurement unit (IMU) of the wearable AR device based on the inertia value of the vehicle, the IMU comprising measurement circuitry;

determine an initial position of the wearable AR device and an initial direction the wearable AR device faces on the first spatial map data, based on an image acquired through a camera of the wearable AR device and the corrected inertia value; and determine the current position and current direction on the first spatial map data, based on the initial position, the initial direction, the inertia value of the vehicle, and the inertia value of the wearable AR device.

10. The wearable AR device of claim 9, wherein the instructions, when executed by the at least one processor, cause the wearable AR device to:

determine whether the inertia value of the wearable AR device has changed;

based on a determination that the inertia value of the wearable AR device has changed, determine whether a difference between a variation in the inertia value of the vehicle and a variation in the inertia value of the wearable AR device is greater than or equal to a threshold value;

based on a determination that the difference between the variation in the inertia value of the vehicle and the variation in the inertia value of the wearable AR device is greater than or equal to the threshold value, determine a variation in an inertia value by a movement of the wearable AR device based on the difference between the variation in the inertia value of the vehicle and the variation in the inertia value of the wearable AR device; and determine the current position and the current direction on the first spatial map data based on the variation in the inertia value by the movement of the wearable AR device.

11. The wearable AR device of claim 8, wherein the instructions, when executed by the at least one processor, cause the wearable AR device to:

based on no anchor devices of the vehicle being capable of communicating with the wearable AR device, determine an initial position of the wearable AR device and an initial direction the wearable AR device faces on the first spatial map data, based on an image acquired through a camera of the wearable AR device;

determine a second variation in position and direction of the wearable AR device using the acquired image; and determine the current position and current direction on the first spatial map data at least by applying the second variation to the initial position and the initial direction on the first spatial map data.

12. The wearable AR device of claim 1, wherein the instructions, when executed by the at least one processor, cause the wearable AR device to:

generate second spatial map data corresponding to the space of the vehicle around the wearable AR device at a position of the wearable AR device in the vehicle;

based on third spatial map data previously generated for the space of the vehicle, retrieve the third spatial map data;

based on spatial information about the space of the vehicle, transform the spatial information into fourth spatial map data; and generate the first spatial map data based on at least one of the second spatial map data, the third spatial map data, or the fourth spatial map data.

13. The wearable AR device of claim 1, wherein the instructions, when executed by the at least one processor, cause the wearable AR device to:

determine a current position of the wearable AR device and a current direction the wearable AR device faces on the first spatial map data based on a current distance and a current angle between the wearable AR device and the anchor devices, and on the reference points.

14. The wearable AR device of claim 1, wherein the instructions, when executed by the at least one processor, cause the wearable AR device to:

receive a user input for determining points on the first spatial map data corresponding to positions of the anchor devices on the first spatial map data;

determine the points based on the user input; and set the determined points as the reference points.

15. An augmented reality (AR) content providing method using a wearable AR device, the AR content providing method comprising:

setting reference points corresponding to positions of anchor devices on first spatial map data corresponding to a space of a vehicle;

determining a position and a direction of the wearable AR device on the first spatial map data based on the reference points and a positional relationship between the wearable AR device and anchor devices; and controlling output of AR content based on the determined position and the determined direction of the wearable AR device.

16. The AR content providing method of claim 15, further comprising:

determining whether the wearable AR device is in the space of a vehicle based on at least one of information received from the vehicle or a value measured using at least one sensor of the wearable AR device; and determining whether anchor devices of the vehicle are capable of communicating with the wearable AR device.

17. The AR content providing method of claim 16, wherein the determining the current direction comprises:

generating second spatial map data corresponding to the space of the vehicle around the wearable AR device at a position of the wearable AR device in the vehicle;

when there is third spatial map data previously generated for the space of the vehicle, retrieving the third spatial map data;

when there is spatial information about the space of the vehicle, transforming the spatial information into fourth spatial map data; and generating the first spatial map data based on at least one of the second spatial map data, the third spatial map data, or the fourth spatial map data.

18. The AR content providing method of claim 16, wherein, while the vehicle is in a stationary state, the setting the reference points comprises:

determining an initial distance and an initial angle between the wearable AR device and the anchor devices by communicating with the anchor devices;

determining points corresponding to positions of the anchor devices on the first spatial map data, based on the measured value, the initial distance, and the initial angle; and setting the determined points as the reference points.

19. The AR content providing method of claim 15, wherein the outputting the AR content comprises:

determining a current position of the wearable AR device and a current direction which the wearable AR device faces on the first spatial map data, at least by communicating with the anchor devices; and outputting AR content corresponding to the current position and the current direction.

20. The AR content providing method of claim 19, wherein the determining the current position and the current direction comprises:

determining the current position and the current direction on the first spatial map data based on a current distance and a current angle between the wearable AR device and the anchor devices and on the reference points.

\*    \*    \*    \*    \*